United States Patent
Takeyoshi et al.

(10) Patent No.: US 8,537,841 B2
(45) Date of Patent: Sep. 17, 2013

(54) CONNECTION SUPPORT APPARATUS AND GATEWAY APPARATUS

(75) Inventors: Haruyuki Takeyoshi, Kawasaki (JP); Naoki Matsuoka, Kawasaki (JP); Tomohiro Ishihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1342 days.

(21) Appl. No.: 11/836,245

(22) Filed: Aug. 9, 2007

(65) Prior Publication Data

US 2007/0274329 A1 Nov. 29, 2007

Related U.S. Application Data

(63) Continuation of application No. PCT/JP2005/003060, filed on Feb. 24, 2005.

(51) Int. Cl.
*H04L 12/28* (2006.01)

(52) U.S. Cl.
USPC .......... 370/401; 713/170; 713/153; 713/168; 713/162; 370/338; 370/352; 709/225

(58) Field of Classification Search
USPC ............... 726/3, 11, 23–25; 713/232, 262, 713/168–170; 370/401
See application file for complete search history.

(56) References Cited

U.S. PATENT DOCUMENTS

| | | | |
|---|---|---|---|
| 6,199,164 B1 * | 3/2001 | Nishimoto et al. | 726/2 |
| 6,804,777 B2 * | 10/2004 | Hollis et al. | 713/170 |
| 6,971,017 B2 * | 11/2005 | Stringer et al. | 713/182 |
| 7,103,772 B2 * | 9/2006 | Jorgensen et al. | 713/168 |
| 7,174,458 B2 | 2/2007 | Araki et al. | |
| 7,231,521 B2 * | 6/2007 | Buddhikot et al. | 713/171 |
| 7,454,785 B2 * | 11/2008 | Kerstens et al. | 726/12 |
| 7,656,877 B1 * | 2/2010 | Sharan et al. | 370/395.2 |
| 7,657,740 B2 * | 2/2010 | Numao et al. | 713/159 |
| 7,913,082 B2 * | 3/2011 | Kim | 713/162 |
| 8,296,825 B2 * | 10/2012 | Leone et al. | 726/4 |
| 2002/0029336 A1 * | 3/2002 | Sekiyama et al. | 713/169 |
| 2002/0056040 A1 * | 5/2002 | Simms | 713/171 |
| 2002/0087858 A1 * | 7/2002 | Oliver et al. | 713/156 |

(Continued)

FOREIGN PATENT DOCUMENTS

| | | | |
|---|---|---|---|
| JP | 2001-344205 | 12/2001 | |
| JP | 2002-108729 A | 4/2002 | |

(Continued)

OTHER PUBLICATIONS

R Poosarla, Cluster based secure routing scheme for wireless ad hoc networks, Apr. 2004, vol. 8, pp. 171-175.*

(Continued)

*Primary Examiner* — Nathan Flynn
*Assistant Examiner* — Viral Lakhia
(74) *Attorney, Agent, or Firm* — Fujitsu Patent Center

(57) ABSTRACT

A problem is to provide a connection support apparatus and a gateway apparatus in which management of information is easy and remote access from a user terminal to the gateway apparatus can be performed easily and securely, and the problem is solved by including a control unit configured to perform control on a gateway apparatus to which a user apparatus connects so as to permit connection from the user apparatus for which authentication succeeds; and a communication unit configured to provide the user terminal with connection information used for connecting to the gateway apparatus.

15 Claims, 35 Drawing Sheets

(56) References Cited

U.S. PATENT DOCUMENTS

| | | | |
|---|---|---|---|
| 2002/0159601 A1* | 10/2002 | Bushmitch et al. | 380/277 |
| 2003/0191848 A1* | 10/2003 | Hesselink et al. | 709/229 |
| 2005/0010757 A1* | 1/2005 | Bosler | 713/156 |
| 2005/0108571 A1* | 5/2005 | Lu et al. | 713/201 |
| 2005/0240758 A1* | 10/2005 | Lord et al. | 713/153 |
| 2005/0281251 A1* | 12/2005 | Yumoto et al. | 370/352 |
| 2006/0143699 A1* | 6/2006 | Nagata et al. | 726/11 |
| 2007/0079368 A1* | 4/2007 | Takeyoshi et al. | 726/15 |
| 2008/0052769 A1* | 2/2008 | Leone et al. | 726/7 |

FOREIGN PATENT DOCUMENTS

| | | |
|---|---|---|
| JP | 2002-135867 | 5/2002 |
| JP | 2002-288134 A | 10/2002 |
| JP | 2003-91503 A | 3/2003 |
| JP | 2004-78280 A | 3/2004 |
| JP | 2004-220120 | 8/2004 |
| JP | 2004-266562 | 9/2004 |
| JP | 2005-33239 A | 2/2005 |

OTHER PUBLICATIONS

International Search Report mailed May 31, 2005, from the corresponding International Application.

K. Hamzeh, et al. "Point-to-Point Tunneling Protocol" Network Working Group, Request for Comments: 2637, http://www.ietf.org/rfc/rfc2637.txt, Jul. 1999.

D. Harkins, et al. "The Internet Key Exchange (IKE)", Network Working Group, Request for Comments: 2409, http://www.ietf.org/rfc/rfc2409.txt, Nov. 1998.

T. Dierks, et al. "The TLS Protocol Version 1.0" Network Working Group, Request for Comments: 2246, http://www.ietf.org/rfc/rfc2246.txt, Jan. 1999.

Japanese Office Action mailed Jan. 22, 2013 for corresponding Japanese Application No. 2011-026438, with Partial English-language Translation.

* cited by examiner

FIG.5A

| USER ID | USER AUTHENTICATION INFORMATION |
|---|---|
| USER 1 | xxxxxx |
| USER 2 | xxxxxx |
| USER 3 | xxxxxx |
| . | . |

FIG.5B

| USER ID | HGW IDENTIFIER | CONNECTION ADDRESS |
|---|---|---|
| USER 1 | ID_HGW1 | https://www... |
| USER 2 | ID_HGW2 | http://www... |
| | ID_HGW3 | ftps IP_HGW_3 |
| USER 3 | ID_HGW1 | https://... |
| . | . | . |

FIG.5C

| HGW IDENTIFIER | HGW IP ADDRESS |
|---|---|
| ID_HGW1 | IP_HGW_1 |
| ID_HGW2 | IP_HGW_2 |
| . | . |

FIG.5D

| USER ID | HGW IDENTIFIER | APPLICATION PORT NUMBER |
|---------|----------------|-------------------------|
| USER 1  | ID_HGW_1       | 443(HTTPS)              |
| USER 2  | ID_HGW_2       | 989(FTPS)               |
| .       | .              | .                       |

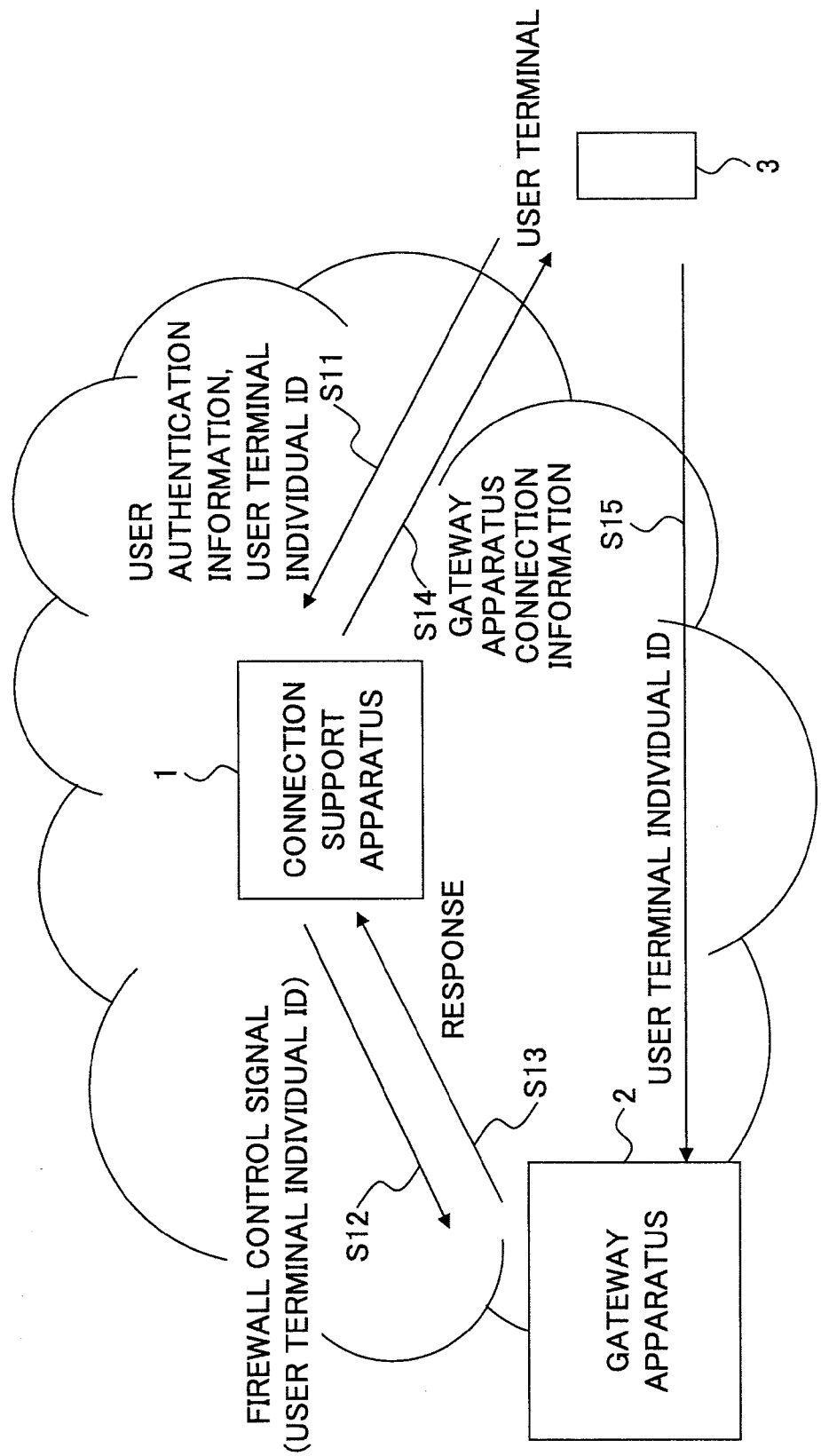

FIG.12

| TERMINAL TYPE | GATEWAY ADDRESS/USER TERMINAL IP ADDRESS |
|---|---|
| "A" CARRIER MOBILE PHONE | xxx.xxx.xxx.0/24 |
| | yyy.yyy.yyy.0/24 |
| "B" CARRIER MOBILE PHONE | zzz.zzz.0.0/16 |
| OTHER THAN ABOVE | USER TERMINAL IP ADDRESS |

FIG.17

```
GET https://www.accessportal.com/menbers/... HTTP/1.1
Host: accessportal.com
User-Agent: xxx/yyy  terminal accommodating carrier name user terminal individual ID (random number) Authorization:
Authorization Basic xxxxxxx
Credential homegw:gateway
```

FIG.18

```
INVITE sips:homegateway@carrier.net SIP/2.0
Via:SIP/2.0/TLS remoteaccessportal@carrier.net;branch=z9hG4bKxxxxxx
Max-Forwards:70
From: sips:remoteaccessportal@carrier.net
To: sips:homegateway@carrier.net
Call-ID:xxx@carrier.net
CSeq:1 INVITE
Contact: sips:remoteaccessportal@carrier.net>
Content-Type:application/ sdp
Content-Length:yyy (blank)

user ID
user terminal individual ID
user terminal ip address
firewall control port number (443)
```

FIG.19

```
SIP/2.0 200 OK
Via: SIP/2.0/TLS remoteaccessportal@carrier.net;branch=z9hG4bkxxxxxx
From: sips:remoteaccessportal@carrier.net;tag=xxxxxx
To: sips:homegateway@carrier.net;tag=yyyyyy
Call-ID: xxx@carrier.net
CSeq:1 INVITE
Contact:sips:homegateway@carrier.net
Content-Type:application/ sdp
Content-Length:yyy
```

FIG.20

```
HTTP1.1 200 OK
DATE:xxxxx
SERVER:xxx/yyy
Content-Type: text/html
CONTENT-Length:xxx
<a href= https://www/foo.com/hgw/hgw_B/top.html >connection</a>
```

FIG.21

```
HTTP/1.1 301 Moved Permanently
DATE: xxxxxxx
LOCATION: https://www.foo.com/hgw_B/top.html /
SERVER: xxxxxxx
CONTENT-Length: xxxxxx
```

FIG.25

```
INVITE sips:homegateway@carrier.net SIP/2.0
Via: SIP/2.0/TLS remoteaccessportal@carrier.net;branch=z9hG4bKxxxxxx
Max-Forwards: 70
From: sips:remoteaccessportal@carrier.net>;tag=xxxxxx
To: sips:homegateway@carrier.net
Call-ID: xxx@carrier.net
CSeq: 1 INVITE
Contact: sips:remoteaccessportal@carrier.net>
Content-Type: application/ sdp
Content-Length: yyy
```

(blank)

```
user ID
user terminal individual ID
gateway address 1   gateway address 2  ···
firewall control port number (443)
```

FIG.29

```
BYE  sips:remoteaccessportal@carrier.net  SIP/2.0
Via: SIP/2.0/TLS homegateway@carrier.net;branch=z9hG4bKxxxxxx
Max-Forwards: 70
From: sips:homegateway@ carrier.net; tag=yyyyy
To: sips:remoteaccessportal@carrier.net;tag=xxxxx
CALL-ID: xxx@carrier.net
CSeq: XXX BYE
Content-Type: application/ sdp
Content-Length: yyy
```

(blank)

user ID
HGW identifier
port number (443)

FIG.30

```
SIP/2.0 200 OK
Via: SIP/2.0/TLS homegateway@carrier.net;branch=z9hG4bKxxxxxx
From: sips:homegateway@carrier.net; tag=yyyyy
To: sips:remoteaccessportal@carrier.net;tag=xxxxxx
CALL-ID: xxx@carrier.net
CSeq: XXX BYE
Content-Length: 0
```

CONNECTION SUPPORT APPARATUS AND GATEWAY APPARATUS

CROSS-REFERENCE TO RELATED APPLICATION

This application is a U.S. continuation application filed under 35 USC 111(a) claiming benefit under 35 USC 120 and 365(c) of PCT application PCT/JP2005/003060, filed on Feb. 24, 2005, the entire contents of which are hereby incorporated by reference.

TECHNICAL FIELD

The present invention relates to a connection support apparatus and a gateway apparatus. More particularly, the present invention relates to a gateway apparatus connected (remotely accessed) from a user terminal, and to a connection support apparatus that supports connection between the user terminal and the gateway apparatus.

BACKGROUND ART

In recent years, a remote access system shown in FIG. 1 is known in which a user connects to a gateway apparatus in a home network or in an intra-company network such as a LAN (Local Area Network) so as to control apparatuses such as digital home electrical apparatuses.

For example, VPN (Virtual Private Network) is an example of a secure remote access system on the Internet. VPN is a technique for encrypting data transmitted between a user terminal (client) performing remote access and a gateway apparatus (server) receiving connection from the user terminal such that the data sent and received between the user terminal and the gateway apparatus cannot be tapped by a third party.

Conventionally, as documents on remote access, the following patent documents 1-2 and non-patent documents 1-3 are known.

[Patent document 1] Japanese Laid-Open Patent Application No. 2002-135867
[Patent document 2] Japanese Laid-Open Patent Application No. 2004-266562
[Non-patent document 1] RFC2637 PPTP (Point to Point Tunneling Protocol)
[Non-patent document 2] RFC2409 The Internet Key Exchange (IKE)
[Non-patent document 3] RFC2246 The TLS Protocol Version 1.0

DISCLOSURE OF THE INVENTION

Problem to be Solved by the Invention

As described in the above documents, techniques for performing remote access to a remote apparatus were known from the past. However, in most cases, in the conventional remote access system, the user terminal and the gateway apparatus are in an one-to-one relationship.

Therefore, when the number of gateway apparatuses increases, the user terminal needs to have connection information, user security information and the like for the number of the gateway apparatuses to be connected. Thus, there is a problem in that management of information becomes complicated.

In addition, as shown in FIG. 2, in the case of VPN (SSL-VPN) and the like in which encryption is performed by SSL (Secure Sockets Layer), since the gateway apparatus needs to always open a port to be connected to the user terminal, there is a problem in that there are a risk to be exposed to DoS (Denial of Service) attack and a possibility to be remotely accessed by an illegal user.

The present invention is contrived in view of the above-mentioned points, and an object is to provide a connection support apparatus and a gateway apparatus by which management of information is easy and remote access from the user terminal to the gateway apparatus can be performed easily and securely.

Means for Solving the Problem

For solving the problem, a connection support apparatus of the present invention is characterized by including:

a control unit configured to perform control on a gateway apparatus to which a user terminal connects so as to permit connection from the user apparatus for which authentication succeeds; and a communication unit configured to provide the user terminal with connection information used for connecting to the gateway apparatus.

In addition, a gateway apparatus is characterized by including:

a setting unit configured to receive a control request from a connection support apparatus and make settings for providing a user apparatus with connection permission so as to permit connection from the user apparatus for which authentication succeeds; and a communication unit configured to permit connection from the user terminal.

In the present invention, the connection support apparatus for performing support for a user terminal to connect to the gateway apparatus is introduced. The connection support apparatus performs control on the gateway apparatus such that the gateway apparatus permits connection from a user terminal for which authentication succeeds so as to enable the user terminal to perform remote access to the gateway apparatus easily and securely.

In addition, the connection support apparatus provides connection information for connecting to the gateway apparatus to the user terminal for which authentication succeeds, so that management of information becomes easy.

Effect of the Invention

According to the present, a connection support apparatus and a gateway apparatus by which management of information is easy and remote access from a user terminal to the gateway apparatus can be performed easily and securely can be provided.

BRIEF DESCRIPTION OF THE DRAWINGS

FIG. 5A is an image diagram of an example of a user authentication database managed by a connection support apparatus;

FIG. 5B is an image diagram of an example of a user connection destination address management database managed by the connection support apparatus;

FIG. 5C is an image diagram of an example of a gateway apparatus address management database managed by the connection support apparatus;

FIG. 5D is an image diagram of an example of a user session management database managed by the connection support apparatus;

FIG. 6 is a schematic diagram of an example of a remote access system using a user terminal individual ID;

FIG. 12 is a configuration diagram of an example of a terminal type management database;

FIG. 17 is a configuration diagram of an example of a user authentication message;

FIG. 18 is a configuration diagram of an example of a firewall control message;

FIG. 19 is a configuration diagram of an example of a firewall control response message;

FIG. 20 is a configuration diagram of an example of a response message;

FIG. 21 is a configuration diagram of an example of a redirect message;

FIG. 25 is a configuration diagram of an example of a firewall control message;

FIG. 29 is a configuration diagram of an example of a session termination report message;

FIG. 30 is a configuration diagram of an example of a session termination report message;

DESCRIPTION OF REFERENCE SIGNS

Figure 1:
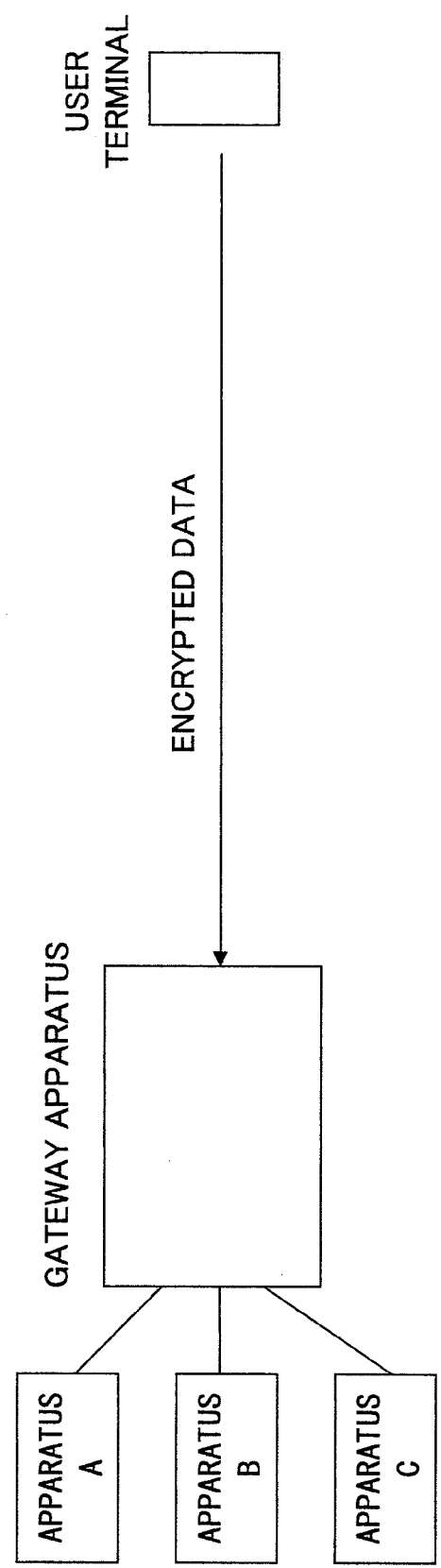
FIG. 1 is a block diagram of an example of a conventional remote access system.
Figure 2:
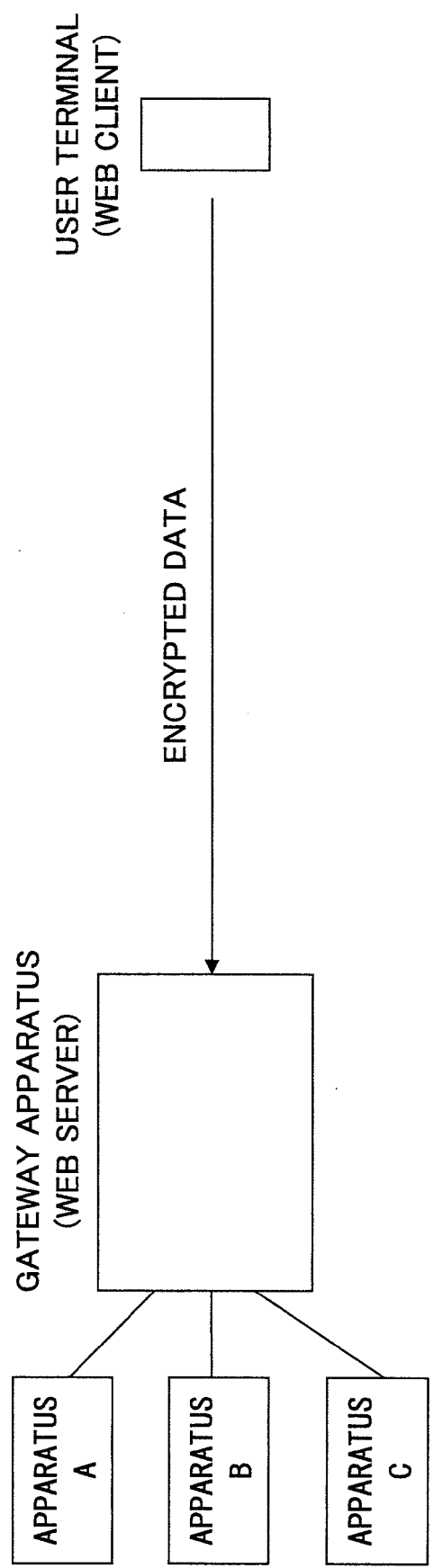
FIG. 2 is a block diagram of another example of a conventional remote access system.

1 connection support apparatus
2, 2a, 2b gateway apparatus
3 user terminal
4 mobile phone IP gateway
11 user request receiving function
12 user authentication function
13 user connection destination management function
14 firewall control function
15 user-gateway apparatus session management function
21 firewall setting function
22 user request receiving function
23a, 23b IP address obtaining function
24 IP filter
26 ID filter
27 random number filter

PREFERRED EMBODIMENTS FOR CARRYING OUT THE INVENTION

Figure 3:
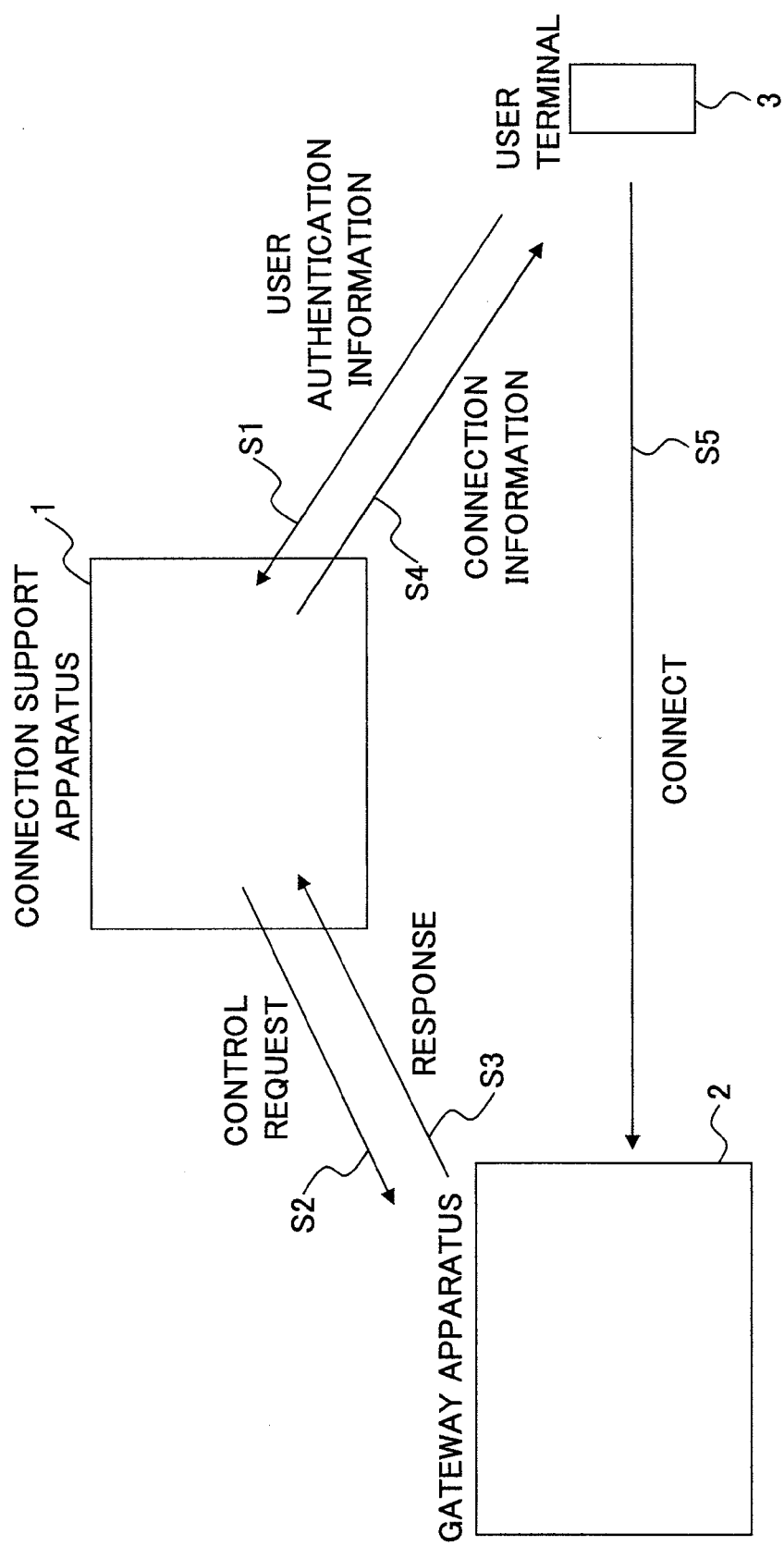
FIG. 3 is a schematic diagram of an example of a remote access system according to the present invention.

FIG. 3 is a schematic diagram of an example of a remote access system according to the present invention. The remote access system of FIG. 3 is configured such that a connection support apparatus 1, a gateway apparatus 2 and a user terminal 3 are connected via a predetermined network.

The connection support apparatus 1 is an apparatus for supporting the user terminal 3 to connect to the gateway apparatus 2. In step S1, the user terminal 3 sends user authentication information to the connection support apparatus 1. The connection support apparatus 1 performs authentication using the received user authentication information.

When the authentication succeeds, the connection support apparatus 1 goes to step S2, and requests the gateway apparatus 2 to perform control so as to permit connection from the user terminal 3. In response to the request of control from the connection support apparatus 1, the gateway apparatus 2 provides connection permission to the user terminal 3. Going to step S3, the gateway apparatus 2 sends a response for the control request to the connection support apparatus 1.

Going to step S4, the connection support apparatus 1 provides the user terminal 3 with connection information for connecting to the gateway apparatus 2. Going to step S5, the user terminal 3 sends a request of connection to the gateway apparatus 2 using the provided connection information. Since the gateway apparatus 2 has provided the user terminal 3 with connection permission, the gateway apparatus 2 permits connection from the user terminal 3.

In the remote access system of FIG. 3, the connection support apparatus 1 can perform control on the gateway apparatus 2 such that the gateway apparatus 2 permits connection from the user terminal 3 for which authentication succeeds. Therefore, in the remote access system shown in FIG. 3, remote access from the user terminal 3 to the gateway apparatus 2 is easily and securely available since the connection support apparatus 1 performs control for the gateway apparatus 2 such that the gateway apparatus 2 permits connection from the user terminal 3 after authentication succeeds.

In addition, in the remote access system of FIG. 3, the connection support apparatus 1 can provide connection information for connecting to the gateway apparatus 2 to the user terminal 3 for which authentication succeeds. Therefore, in the remote access system of FIG. 3, since the connection support apparatus 1 manages connection information for connecting to the gateway apparatus 2, information management is easy even when the number of gateway apparatuses 2 increases.

Figure 4:
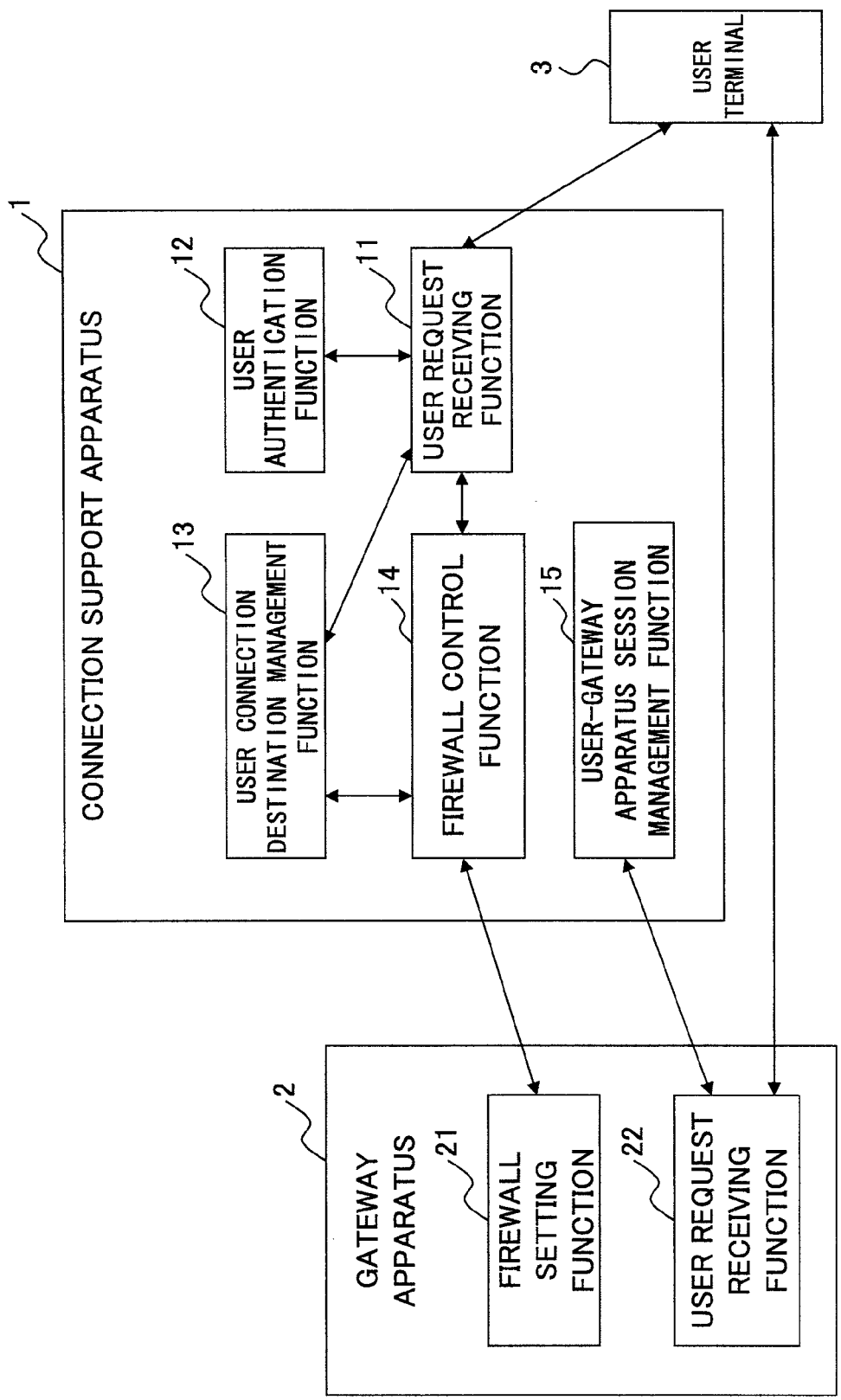
FIG. 4 is a block diagram of an example of a remote access system according to the present invention.

Further, the remote access system according to the present invention is described. FIG. 4 is a block diagram of an example of a remote access system according to the present invention. FIG. 4 shows functional blocks of the connection support apparatus 1 and the gateway apparatus 2, and shows interfaces among the connection support apparatus 1, the gateway 2 and the user terminal 3.

The connection support apparatus 1 includes a user request receiving function 11, a user authentication function 12, a user connection destination management function 13, a firewall control function 14, and a user-gateway apparatus session management function 15. The user request receiving function 11 receives a request from the user terminal 3. The user authentication function 12 performs authentication of the user. The user connection destination management function 13 manages address information of connection destination of the user terminal 3.

The firewall control function 14 performs firewall control of the gateway apparatus 2 to connect the user terminal 3 to the gateway apparatus 2. The user-gateway apparatus session management function 15 manages a session between the gateway apparatus 2 and the user terminal 3.

The gateway apparatus 2 includes a firewall setting function 21 and a user request receiving function 22. The firewall setting function 21 performs firewall setting in response to a request from the connection support apparatus 1. The user request receiving function 22 receives a request from the user terminal 3.

Between the gateway apparatus 2 and the user terminal 3, there are an interface via the connection support apparatus 1 and an interface for direct connection. The connection support apparatus includes databases shown in FIGS. 5A-5D.

FIGS. 5A-5D are image diagrams of examples of the databases managed by the connection support apparatus. FIG. 5A indicates a user authentication database. FIG. 5B indicates a user connection destination address management database. FIG. 5C indicates a gateway apparatus address management database. In addition, FIG. 5D indicates a user session management database.

The user authentication database shown in FIG. 5A is for managing user ID and user authentication information by associating them with each other. The user connection destination address management database shown in FIG. 5B manages user ID, HGW identifier that is identifier of the gateway apparatus 2 and connection destination address of the user terminal 3 by associating them with each other. The gateway apparatus address management database shown in FIG. 5C manages HGW identifier, and IP address (HGW IP address) of the gateway apparatus 2 by associating them with each other.

The user session management database shown in FIG. 5D manages the user ID, the HGW identifier, and application port number indicating port to which the user terminal 3 is connected by associating them with each other. By the way, the port is an identifier to identify an application to which the user terminal 3 connects.

FIG. 6 is a schematic diagram of an example of a remote access system using a user terminal individual ID. In step S11, the user terminal 3 sends user authentication information and a user terminal individual ID to the connection support apparatus 1.

When the authentication succeeds, the connection support apparatus 1 goes to step S12, and sends a firewall control signal including the user terminal individual ID to the gateway apparatus 2. For example, information included in a User Agent value in a HTTP message sent from the user terminal 3 can be used as the user terminal individual ID.

The gateway apparatus 2 makes settings for providing connection permission to the user terminal 3 in response to the firewall control signal. Going to step S13, the gateway apparatus 2 sends a response for the firewall control signal to the connection support apparatus 1. Going to step S14, the connection support apparatus 1 sends a message including gateway apparatus connection information for connecting to the gateway apparatus 2 to the user terminal 3.

Going to step S15 after receiving the message including the gateway apparatus connection information from the connection support apparatus 1, the user terminal 3 sends a HTTP message including the user terminal individual ID directly to the gateway apparatus 2. The gateway apparatus 2 compares the user terminal individual ID received from the connection support apparatus 1 in step S12 with the user terminal individual ID received from the user terminal 3 in step S15 so that the gateway apparatus 2 can authenticate that a proper user performs connection using a proper user terminal 3.

The remote access system of the present invention can be applied even when the user terminal individual ID is replaced with a user individual ID and even when authentication is performed using both of the user terminal individual ID and the user individual ID. The user individual ID is assumed to be configured by an inserting type memory and the like for the user terminal 3. When performing authentication using the user individual ID, the remote access system by the present invention is applicable to various terminals that can use the inserting type memory.

By the way, in actual communications, if the user terminal individual ID and the user individual ID are transmitted over the Internet in plain texts, there is a risk of leakage of user privacy. Thus, it is assumed that the remote access system of the present invention is applied to a network within a single carrier or applied to an encrypted communication route.

For example, in a case when performing communication using HTTPS (Hypertext Transfer Protocol Security), the user terminal 3 can encrypt the user terminal individual ID and the user individual ID and send them to the connection support apparatus 1 or the gateway apparatus 2 by including the user terminal individual ID and the user individual ID into a user agent value of the HTTPS header.

Figure 7:
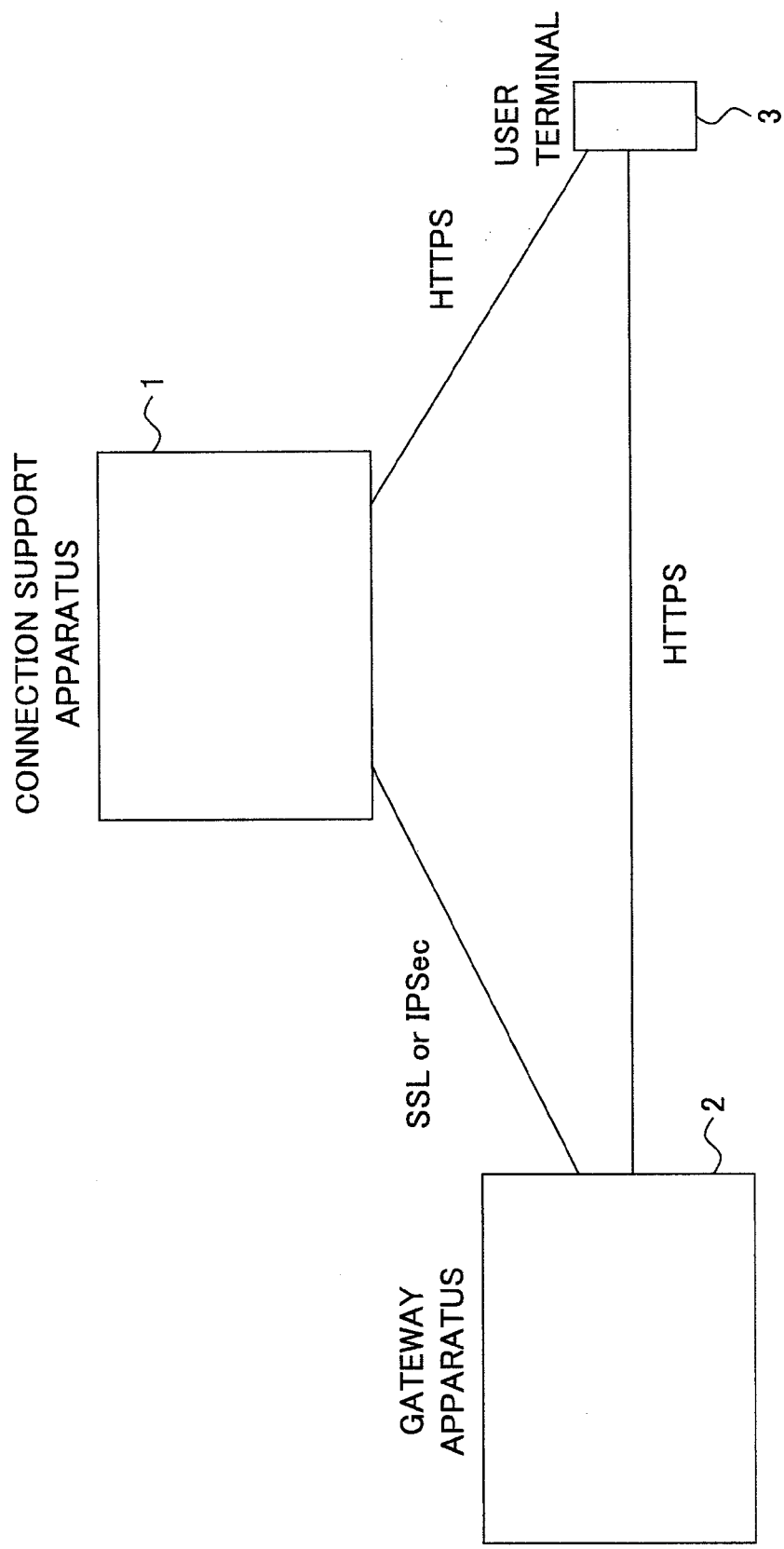
FIG. 7 is a block diagram of an example of an encrypted communication route.

FIG. 7 is a block diagram of an example of the encrypted communication route. For example, the user terminal 3 can send the user terminal individual ID and the user individual ID to the connection support apparatus 1 and the gateway apparatus 2 using the HTTPS by including the user terminal individual ID and the user individual ID into a user agent of a Web browser. In addition, the firewall control signal transmitted between the connection support apparatus 1 and the gateway apparatus 2 can be encrypted by SSL or IPsec.

Figure 8:
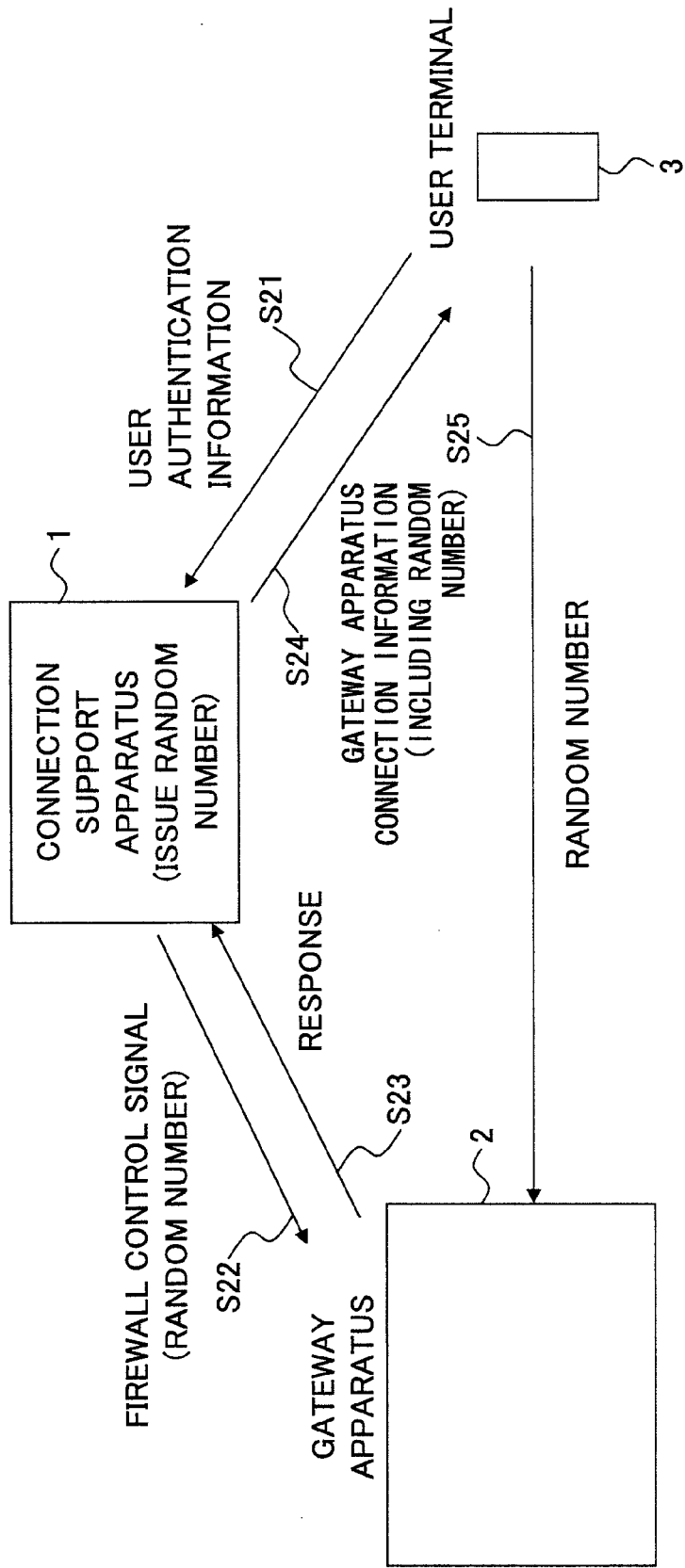
FIG. 8 is a schematic diagram of an example of a remote access system using a random number.

FIG. 8 is a schematic diagram of an example of a remote access system using a random number. In step S21, the user terminal 3 sends user authentication information to the connection support apparatus 1. When authentication succeeds, the connection support apparatus 1 issues a unique random number. From a security protection viewpoint, the random number needs to be issued based on a method such as a 32 bit random binary character string where it is not easily identified. Going to step S22, the connection support apparatus 1 sends a firewall control signal including the random number to the gateway apparatus 2.

The gateway apparatus 2 makes settings for providing the user terminal 3 with connection permission in response to the firewall control signal. Going to step S23, the gateway apparatus 2 sends a response for the firewall control signal to the connection support apparatus 1. Going to step S24, the connection support apparatus 1 sends gateway apparatus connection information including the random number to the user apparatus 3.

Going to step S25 after receiving the gateway apparatus connection information including a random number from the connection support apparatus 1, the user terminal 3 directly sends a HTTP message including the random number to the gateway apparatus 2. The gateway apparatus 2 compares the random number received from the connection support apparatus 1 in step S22 with the random number received from the user terminal 3 in step S25 so that it can authenticate that a proper user performs connection using a proper user terminal 3. Since the remote access system using the random number does not depend on terminal types of the user terminal 3, it can be applied to various terminals to which the user terminal individual ID is not provided.

By the way, in actual communications, like the remote access system using the before-mentioned user terminal individual ID, secrecy can be kept by sending data using a communication route encrypted by SSL or IPsec. The remote access system according to the present invention can perform two types of connection support using the user terminal individual ID or the random number according to usage.

In the remote access system according to the present invention, a case is assumed in which a remote access service operator has the connection support apparatus 1 and the gateway apparatus 2 is placed in a home network or an intra-company network and the like connected to a network such as the Internet.

Under present circumstances, IPv4 addresses assigned to many homes are not fixed values and they are dynamically assigned by ISP (Internet Service Provider) in most cases.

Figure 9:
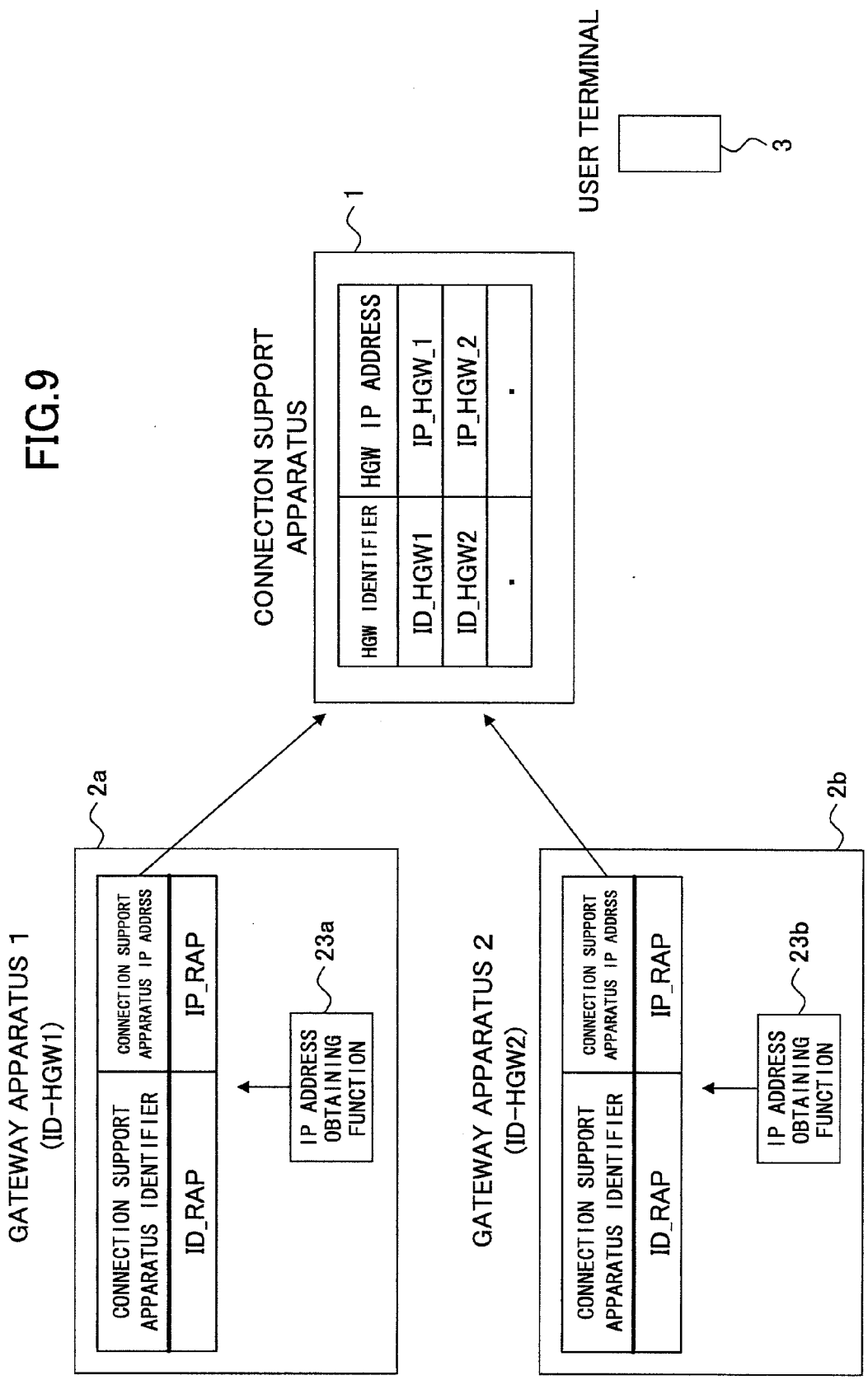
FIG. 9 is a schematic diagram of an example of a gateway apparatus address management process performed by the connection support apparatus.

FIG. 9 is a schematic diagram of an example showing a gateway apparatus address management process performed by the connection support apparatus. The remote access system of FIG. 9 has a configuration in which a connection support apparatus 1, gateway apparatuses 2a and 2b, and a user apparatus 3 are connected via a predetermined network.

The gateway apparatuses 2a and 2b include IP address obtaining functions 23a and 23b respectively. When the gateway apparatus is newly assigned an IP address, the gateway apparatus sends a changed IP address (HGW IP address) and a HGW identifier to the connection support apparatus 1 in which connection support apparatus identifiers and connection support apparatus IP addresses are registered beforehand.

Based on the IP address and the HGW identifier received from the gateway apparatus 2a or 2b, the connection support apparatus 1 updates the gateway apparatus address management database. Accordingly, even when the IP address of the gateway apparatus 2a, 2b is dynamically assigned, the connection support apparatus 1 can perform address resolution for the gateway apparatuses 2a and 2b.

Figure 10:
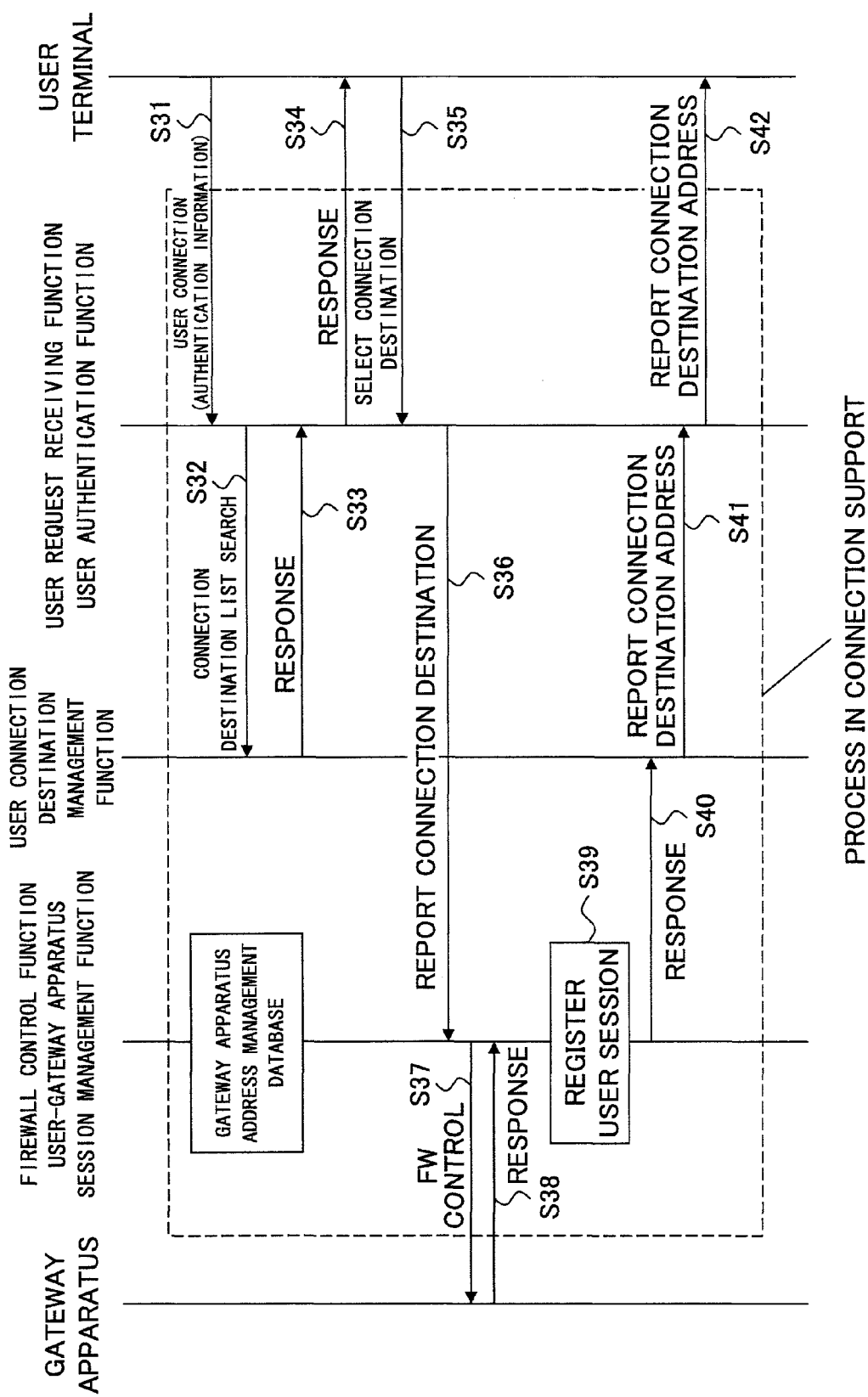
FIG. 10 is a sequence diagram of an example showing processes of the connection support apparatus in a case where terminal type determination is not performed.

Next, as to processes of the remote access system of the present invention, processes of the connection support apparatus 1 are mainly described. FIG. 10 is a sequence diagram of an example showing the processes of the connection support apparatus in a case where terminal type determination is not performed.

In step S31, the user terminal 3 sends user authentication information to the user request receiving function 11 of the connection support apparatus 1. The user request receiving function 11 performs authentication using the user authentication function 12. When authentication succeeds, the user request receiving function 11 goes to step S32 to request the user connection destination management function 13 to search the connection destination list.

Going to step S33, the user connection destination management function 13 searches a connection destination list of the user terminal 3 using the user connection destination address management database and sends the connection destination list to the user request receiving function 11 as a response. In addition, the user request receiving function 11 goes to step S34 to send the received connection destination list to the user terminal 3.

When receiving the connection destination list from the connection support apparatus 1, the user terminal 3 displays the connection destination list on a display screen. The user selects a gateway apparatus 2 from the connection destination list by operating the user terminal 3. Going to step S35, the user terminal 3 sends the connection destination selected by the user to the user request receiving function 11 of the connection support apparatus 1.

Going to step S36, the user request receiving function 11 reports a gateway apparatus 2 of the connection destination to the firewall control function 14. The firewall control function 14 searches for the IP address of the gateway apparatus 2 using the gateway apparatus address management database.

Going to step S37, the firewall control function 14 requests the gateway apparatus 2 to perform control using the IP address of the gateway apparatus 2. Going to step S38, after the gateway apparatus 2 provides the user terminal 3 with connection permission, the gateway apparatus 2 sends a response for the control request to the firewall control function 14 of the connection support apparatus 1. Going to step S39, the user-gateway apparatus session management function 15 registers a session between the gateway apparatus 2 and the user terminal 3 into the user session management database to manage it.

Going to step S40, the firewall control function 14 sends a response to the user connection destination management function 13. The user connection destination management function 13 searches address information of the connection destination (connection address of the gateway apparatus 2) using the user connection destination address management database to send the address information to the user request receiving function 11. Going to step S42, the user request receiving function 11 sends the address information of the connection destination to the user terminal 3 as gateway apparatus connection information.

When receiving the gateway apparatus connection information, the user terminal 3 can connect to the gateway apparatus 2 using the gateway apparatus connection information.

Figure 11:
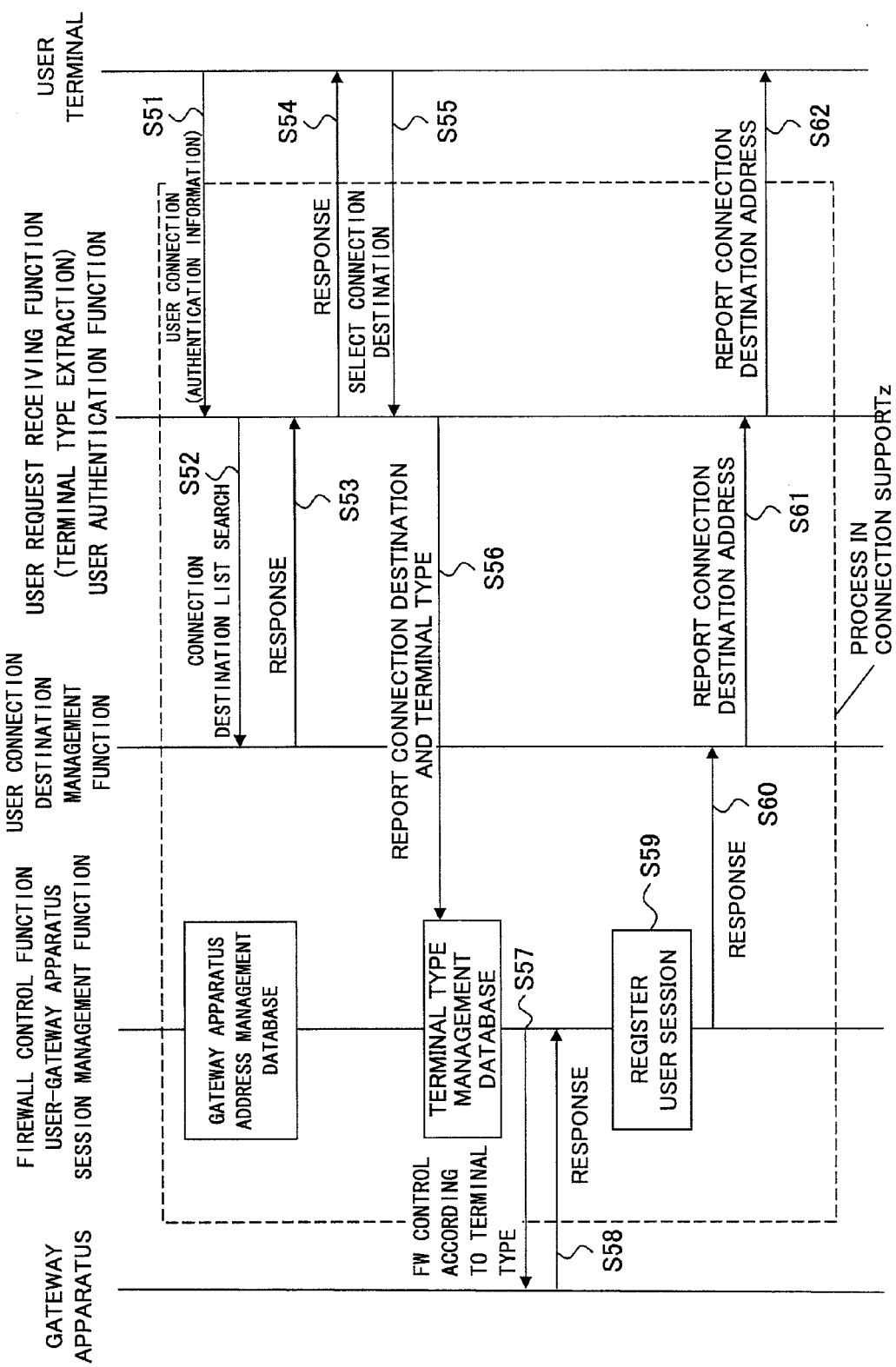
FIG. 11 is a sequence diagram of an example showing processes of the connection support apparatus in a case where terminal type determination is performed.

FIG. 11 is a sequence diagram of an example showing processes of the connection support apparatus in a case where terminal type determination is performed. By the way, since the sequence diagram of FIG. 11 is the same as the sequence diagram of FIG. 10 except for a part, descriptions are omitted as necessary.

Since processes of steps S51-S55 are the same as those of steps S31-S35 in FIG. 10, those are not described. Going to step S56, the user request receiving function 11 reports a gateway apparatus 2 of the connection destination and a terminal type of the user terminal 3 to the firewall control function 14. By the way, the user request receiving function 11 can extract the terminal type of the user terminal 3.

The firewall control function 14 includes a terminal type management database shown in FIG. 12. FIG. 12 is a configuration diagram of an example of the terminal type management database. The terminal type management database manages terminal types and IP addresses of after-mentioned mobile phone IP gateway apparatuses or user terminals 3 by associating them.

The firewall control function 14 searches an IP address of the mobile phone IP gateway apparatus or the user terminal 3 using the terminal type management database. In addition, the firewall control function 14 searches for an IP address of the gateway apparatus 2 using the gateway apparatus address management database.

Going to step S57, the firewall control function 14 requests the gateway apparatus 2 to perform control according to the terminal type of the user terminal 3 using the IP address of the gateway apparatus 2. Going to step S58, after the gateway apparatus 2 provides the user terminal 3 with connection permission, the gateway apparatus 2 sends a response for the control request to the firewall control function 14 of the connection support apparatus 1. Going to step S59, the user-gateway apparatus session management function 15 registers a session between the gateway apparatus 2 and the mobile phone IP gateway apparatus or the user terminal 3 into the user session management database and manages it.

Since processes of steps S60-S62 are the same as those of steps S40-S42 of FIG. 10, the processes are not described.

Figure 13:
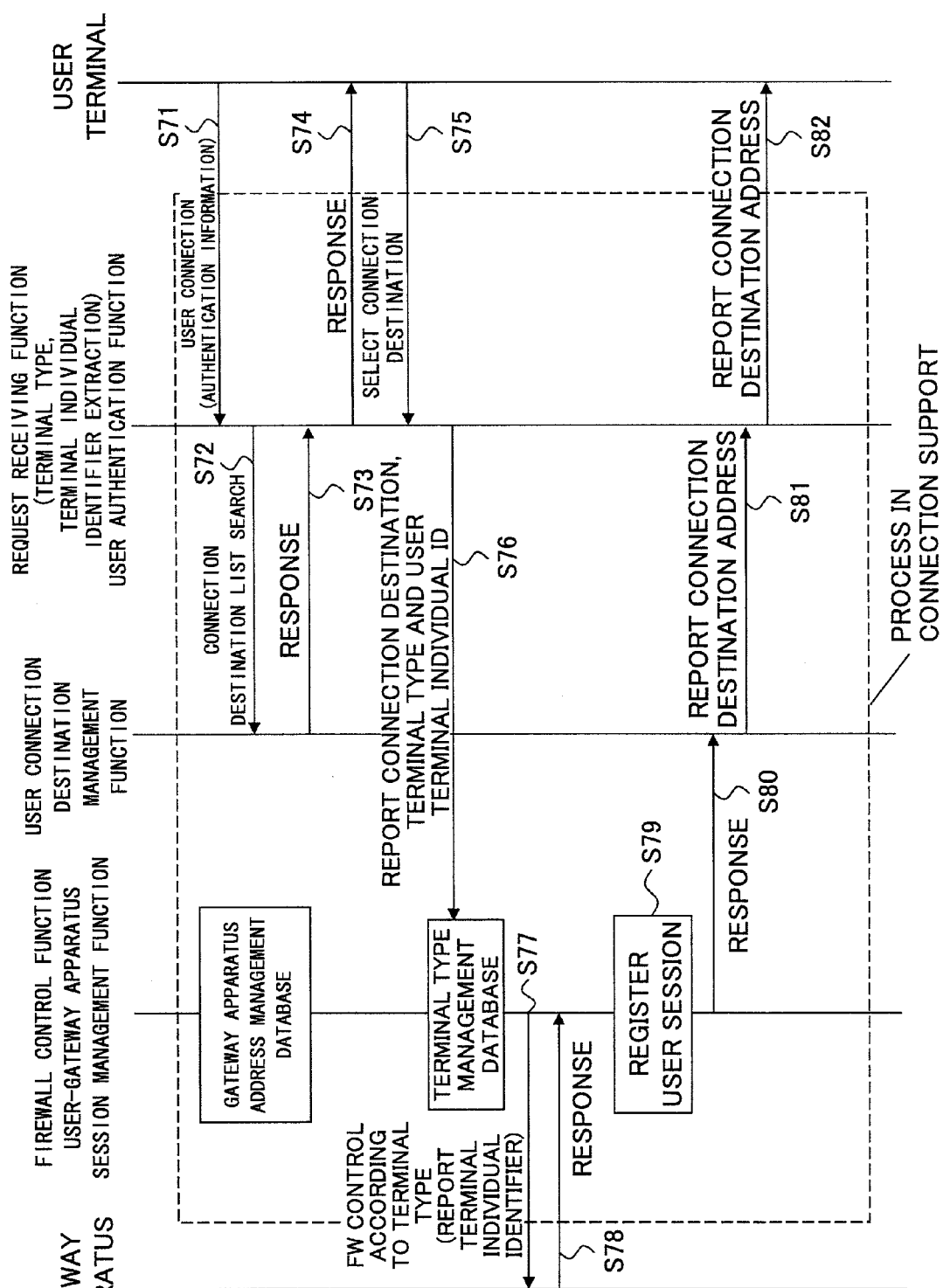
FIG. 13 is a sequence diagram of an example showing processes of the connection support apparatus in the case where terminal type determination is performed and the user terminal individual ID is provided.

FIG. 13 is a sequence diagram of an example showing processes of the connection support apparatus in the case where terminal type determination is performed and the user terminal individual ID is provided. By the way, since the sequence diagram of FIG. 13 is the same as the sequence diagram of FIG. 11 except for a part, descriptions are omitted as necessary.

Since processes of steps S71-S75 are the same as those of steps S51-S55 in FIG. 11, those are not described. Going to step S76, the user request receiving function 11 reports a gateway apparatus 2 of a connection destination, a terminal type and a user terminal individual ID of the user terminal 3 to the firewall control function 14. By the way, the user request receiving function 11 can extract the terminal type and the user terminal individual ID of the user terminal 3.

The firewall control function 14 searches an IP address of the mobile phone IP gateway apparatus or the user terminal 3 using the terminal type management database shown in FIG. 12. In addition, the firewall control function 14 searches for an IP address of the gateway apparatus 2 using the gateway apparatus address management database.

Going to step S77, the firewall control function 14 requests the gateway apparatus 2 to perform control according to the terminal type of the user terminal 3 using an IP address of the gateway apparatus 2. By the way, in step S77, the user terminal individual ID is reported to the gateway apparatus 2.

Since processes of steps S78-S82 are the same as those of steps S58-S62 of FIG. 11, the processes are not described.

Figure 14:
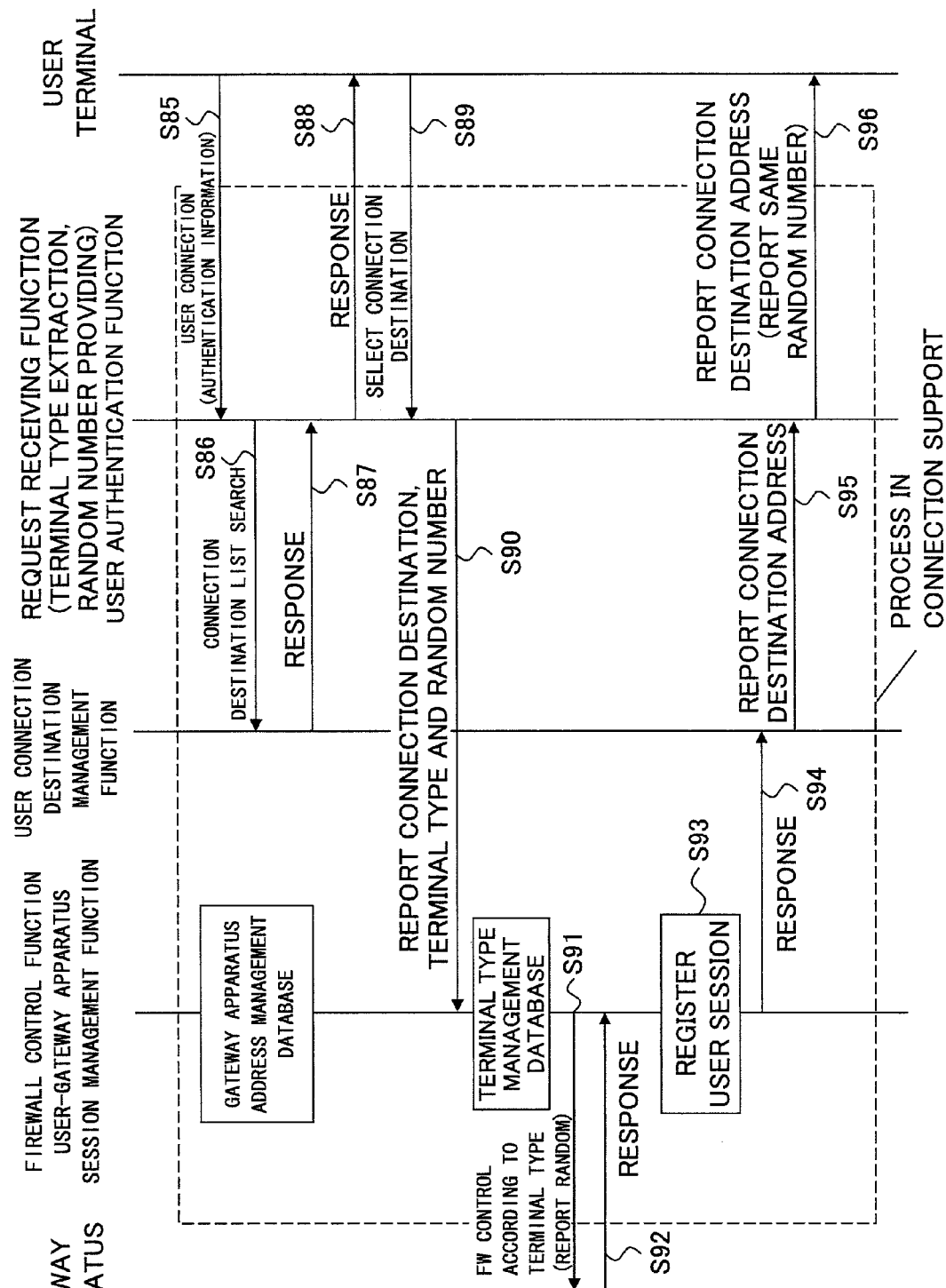
FIG. 14 is a sequence diagram of an example showing processes of the connection support apparatus in the case where terminal type determination is performed and the random number is provided.

FIG. 14 is a sequence diagram of an example showing processes of the connection support apparatus in the case where terminal type determination is performed and the random number is provided. By the way, since the sequence diagram of FIG. 14 is the same as the sequence diagram of FIG. 13 except for a part, descriptions are omitted as necessary.

Since processes from step S85-S89 are the same as those of steps S71-S75 in FIG. 13, those are not described. Going to step S90, the user request receiving function 11 reports a gateway apparatus 2 of a connection destination, a terminal type of the user terminal 3 and a random number to the firewall control function 14. By the way, the user request receiving function 11 can extract the terminal type of the user terminal 3. In addition, the user request receiving function 11 can issue a unique random number.

The firewall control function 14 searches for an IP address of the mobile phone IP gateway apparatus or the user terminal 3 using the terminal type management database shown in FIG. 12. In addition, the firewall control function 14 searches for an IP address of the gateway apparatus 2 using the gateway apparatus address management database.

Going to step S91, the firewall control function 14 requests the gateway apparatus 2 to perform control according to the terminal type of the user terminal 3 using an IP address of the gateway apparatus 2. By the way, in step S91, the random number is reported to the gateway apparatus 2.

Since processes of steps S92-S95 are the same as those of steps S78-S81 of FIG. 13, the processes are not described. Going to step S96, the user request receiving function 11 sends address information of the connection destination and the random number to the user terminal 3 as gateway apparatus connection information.

Figure 15:
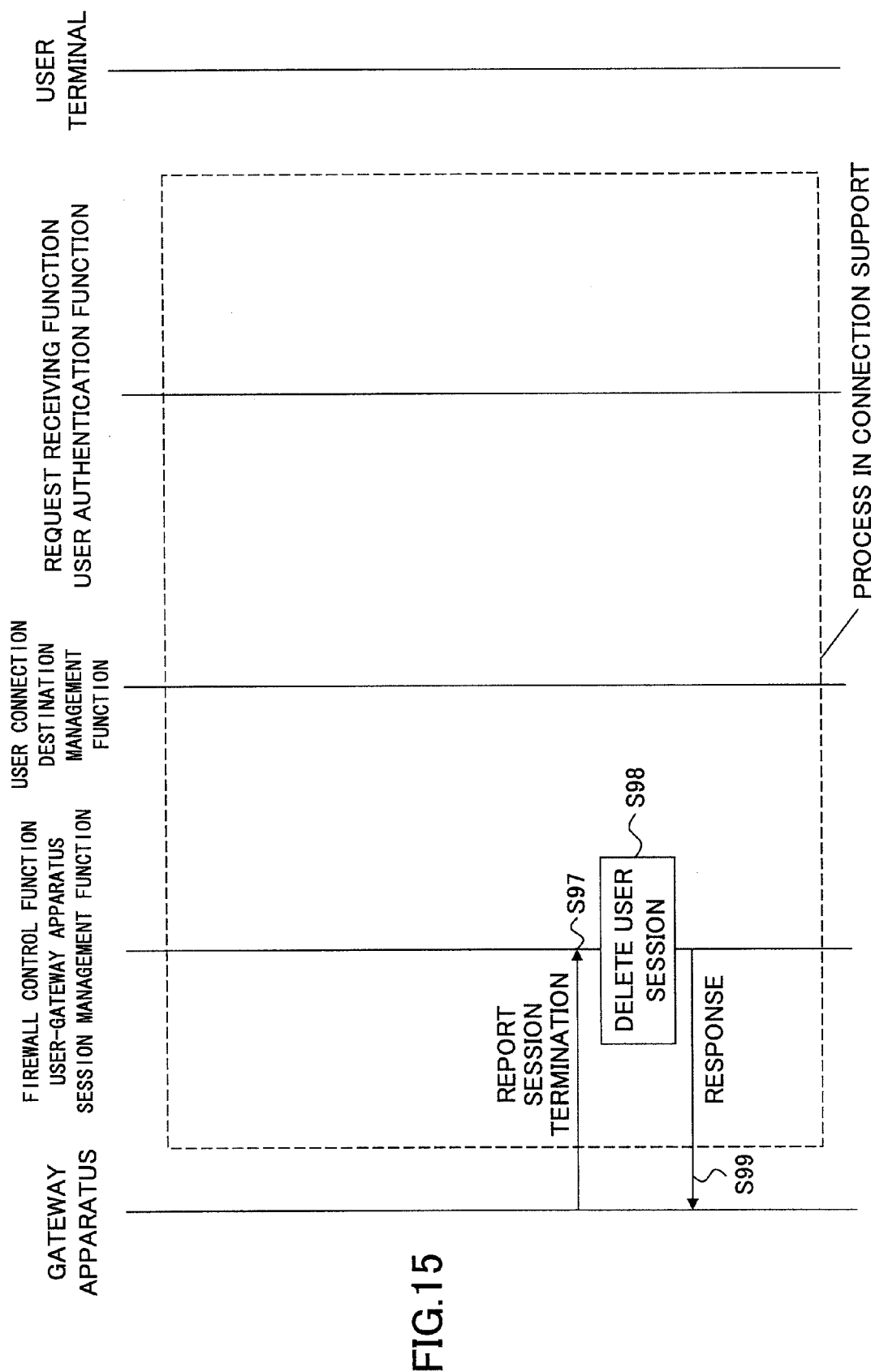
FIG. 15 is a sequence diagram of an example showing processes of the connection support apparatus for session termination.

FIG. 15 is a sequence diagram of an example showing processes of the connection support apparatus for session termination. When receiving a logout request, for example, from the user terminal 3, the gateway apparatus 2 goes to step S97, and reports session termination to the user-gateway apparatus session management function 15 of the connection support apparatus 1.

After the session termination is reported, the user-gateway apparatus session management function 15 goes to step S98, and deletes the session between the gateway apparatus 2 and the user terminal 3 from the user session management database. Then, going to step S99, the user-gateway apparatus session management function 15 sends a response to the user connection destination management function 13.

In the following, as to embodiments of the remote access system of the present invention, firewall control performed by cooperation between the connection support apparatus 1 and the gateway apparatus 2 is mainly described.

EMBODIMENT 1

Figure 16:
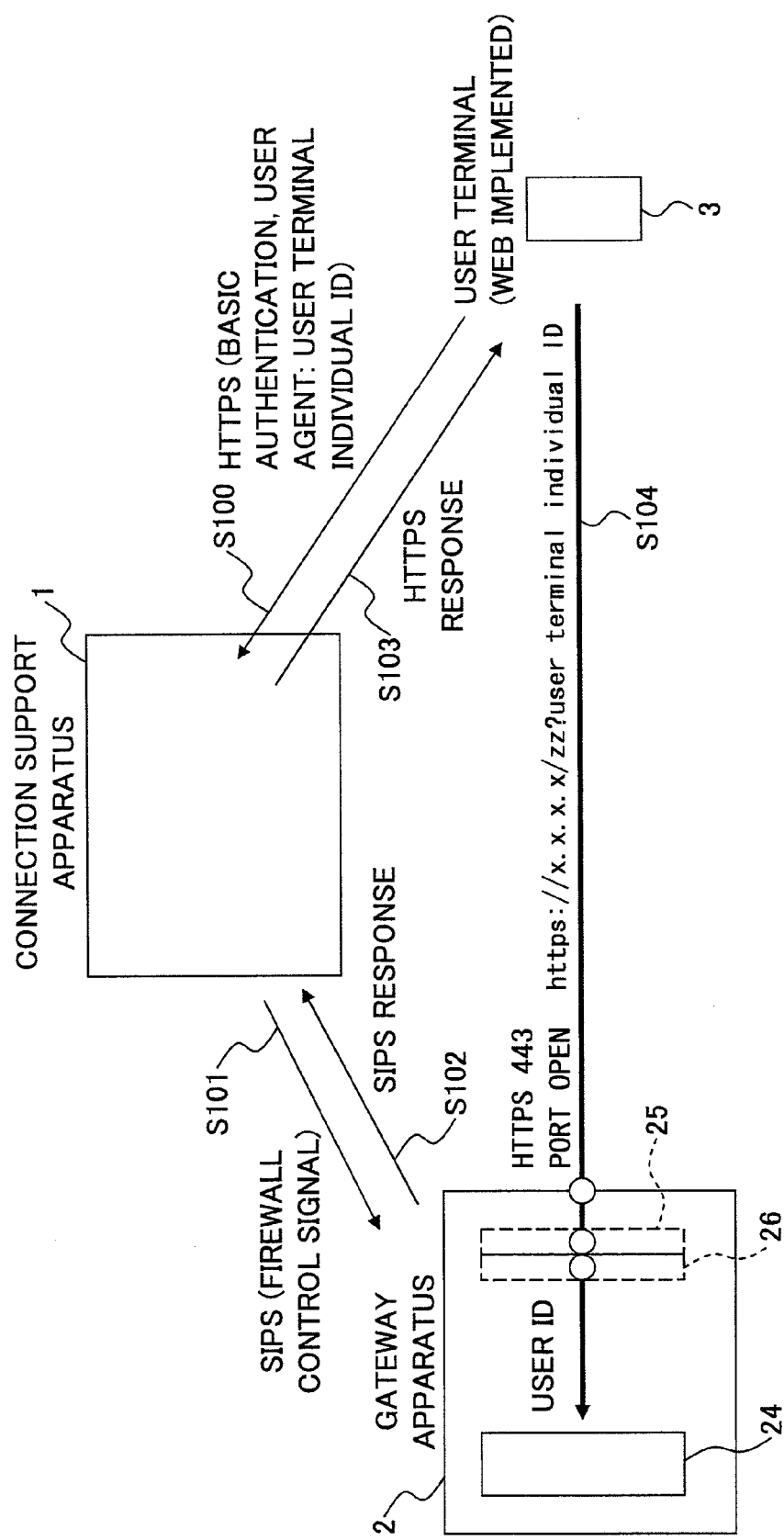
FIG. 16 is a block diagram of a first embodiment of the remote access system according to the present invention.

FIG. 16 is a block diagram of the first embodiment of the remote access system of the present invention. In the remote access system of the embodiment 1, an example is described in which the user terminal 3 has an IP address.

Going to step S100, the user terminal 3 sends a user ID, a password and a user terminal individual ID for basic authentication to the connection support apparatus 1 using a user authentication message shown in FIG. 17, for example.

By the way, by using a communication route encrypted by SSL, the user ID, the password and the user terminal individual ID are encrypted and sent to the connection support apparatus 1.

After the authentication succeeds, the connection support apparatus 1 may refer to the user connection destination address management database shown in FIG. 5B so as to report a connection destination list to the user terminal 3. In this case, the user can select one gateway apparatus 2 from the connection destination list.

By the way, as a result of referring to the user connection destination address management database, when the number of the gateway apparatus 2 associated with the user ID is one, the connection destination list may not be reported to the user terminal 3.

Going to step S101, the connection support apparatus 1 sends a firewall control signal to the gateway apparatus 2 using a firewall control message shown in FIG. 18 for example. By the way, SIPS (Session Initiation Protocol Security) is an example of communication protocols in which encryption is available.

The gateway apparatus 2 opens a port number (firewall control port number) reported by the firewall control signal. For example, the gateway apparatus 2 opens a port of HTTPS: 443. In addition, the gateway apparatus 2 performs firewall transmission setting for the IP filter 25 such that the IP address of the user terminal 3 transmits. In addition, the gateway apparatus 2 performs firewall transmission setting for the ID filter 26 such that the user terminal individual ID reported by the firewall control signal transmits.

Going to step S102, the gateway apparatus 2 sends, to the connection support apparatus 1, a firewall control response message shown in FIG. 19, for example. By the way, the connection support apparatus 1 may send an acknowledgement response (ACK) for receiving the SIPS response message to the gateway apparatus 2 using a sequence of a SIPS protocol.

Going to step S103, the connection support apparatus 1 reports, to the user terminal 3, connection information (URL link information) for the user terminal 3 to connect to the gateway apparatus 2 using a response message shown in FIG. 20, for example.

When the URL link information is selected by the user. The user terminal 3 goes to the step S104, and the user terminal 3 adds the user terminal individual ID to the URL link information reported from the connection support apparatus 1 to send a HTTPS message including the user terminal individual ID to the gateway apparatus 2. The HTTPS message including the user terminal individual ID sent to the gateway apparatus 2 passes through the opened port, and the IP filter 25 and the ID filter 26 for which firewall transmission setting has been performed so that the HTTPS message is sent to the Web application 24.

That is, the user terminal 3 can connect to the Web application 24 of the gateway apparatus 2. By the way, the connection support apparatus 1 can use a redirect message shown in FIG. 21 instead of the response message shown in FIG. 20. When using the redirect message shown in FIG. 21, the user terminal 3 can connect to the gateway apparatus 2 by selecting the gateway apparatus 2 once.

Figure 22:
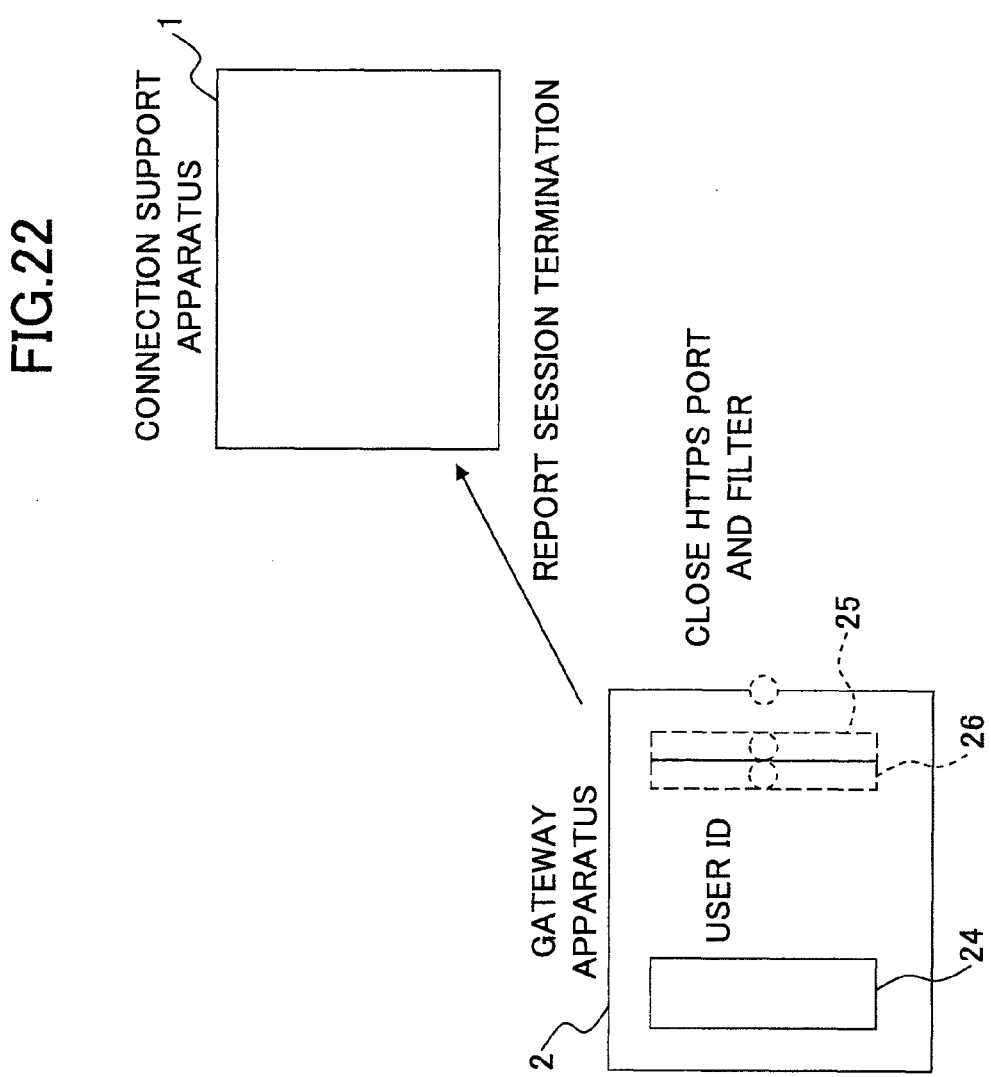
FIG. 22 is a schematic diagram showing a user log-out process of the remote access system according to the present invention.

FIG. 22 is a schematic diagram showing user log-out process of the remote access system according to the present invention. When the user performs logout for the Web application 24, the gateway apparatus 2 closes the opened port. For example, the gateway apparatus 2 closes the port of HTTPS: 443.

In addition, the gateway apparatus 2 releases the firewall transmission setting for the IP filter 25 and the ID filter 26. Then, the gateway apparatus 2 reports termination of the session to the user terminal 3 to the connection support apparatus 1.

EMBODIMENT 2

Figure 23:
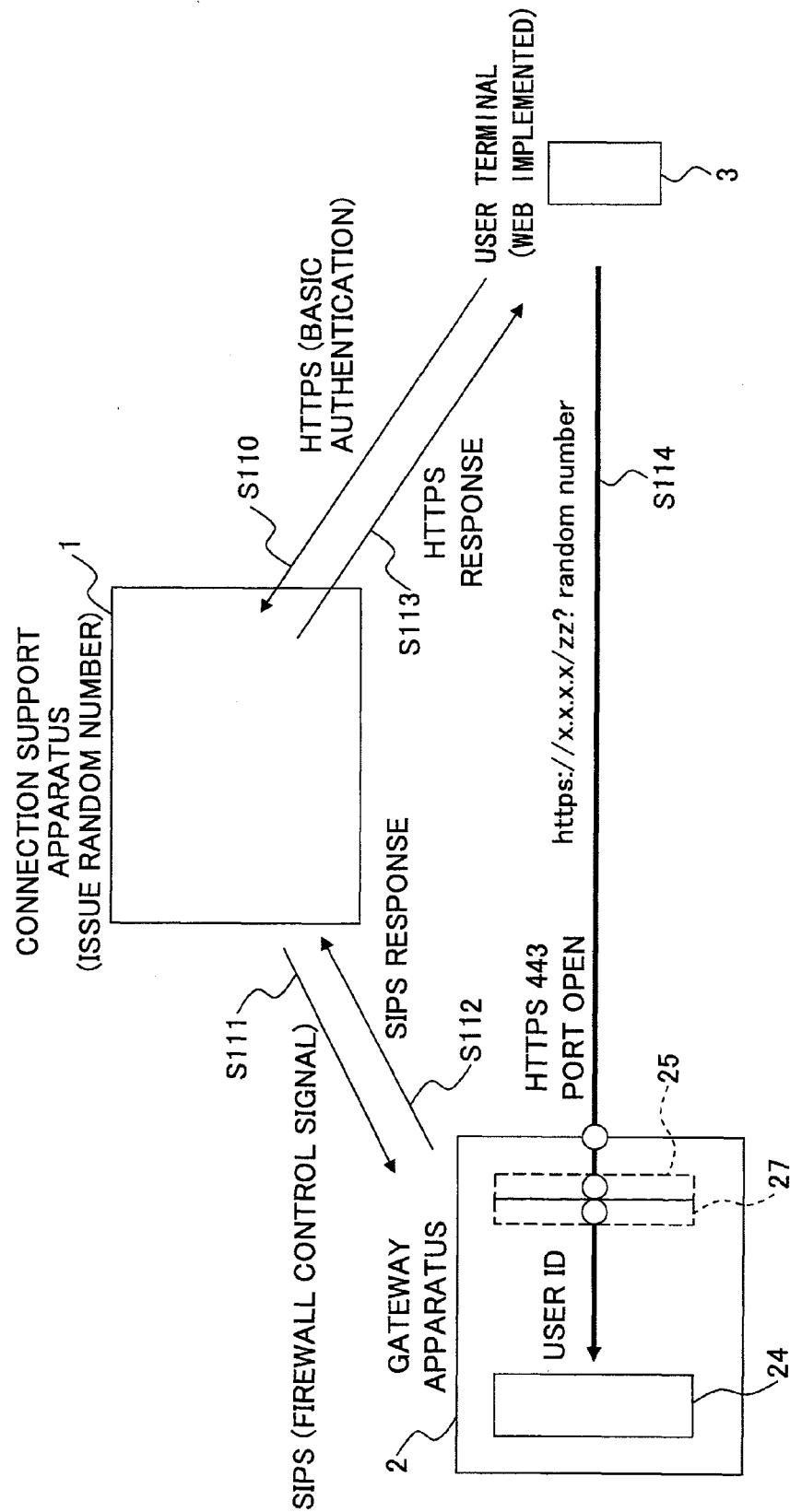
FIG. 23 is a block diagram of a second embodiment of the remote access system according to the present invention.

FIG. 23 is a block diagram of the second embodiment of the remote access system according to the present invention.

In the remote access system of the embodiment 2, an example is described in which the user terminal 3 has an IP address.

By the way, since processes of the remote access system of FIG. 23 are the same as those of the remote access system of FIG. 16 except for a part, descriptions are omitted as necessary. Going to step S110, the user terminal 3 sends a user ID and a password for basic authentication to the connection support apparatus 1 using the user authentication message. By the way, the user authentication message used in the embodiment 2 is one obtained by removing the user terminal individual ID from the user authentication message shown in FIG. 17.

After authentication succeeds, the connection support apparatus 1 issues a unique random number. Going to step S111, the connection support apparatus 1 sends a firewall control signal to the gateway apparatus 2 using a firewall control message. By the way, the firewall control message used in the embodiment 2 is one obtained by replacing the user terminal individual ID of the firewall control message of FIG. 18 with a random number.

The gateway apparatus 2 opens the port number reported by the firewall control signal. In addition, the gateway apparatus 2 performs firewall transmission setting for the IP filter 25 such that the IP address of the user terminal 3 transmits. In addition, the firewall apparatus 2 performs firewall transmission setting for a random number IP filter 27 such that the random number reported by the firewall control signal transmits.

Going to step S112, the gateway apparatus 2 sends a firewall control response message shown in FIG. 19 for example to the connection support apparatus 1. Going to step S113, the connection support apparatus 1 sends, to the user terminal 3, connection information (URL link information) for the user terminal 3 to connect to the gateway apparatus 2 by using a response message.

By the way, the response message used in the embodiment 2 is one obtained by adding a random number after the URL included in the response message shown in FIG. 20. Going to step S114, the user terminal 3 sends a HTTPS message including the URL link information reported from the connection support apparatus 1 to the gateway apparatus 2.

The HTTPS message including the URL link information sent to the gateway apparatus 2 passes through the opened port, the IP filter 25 and the random number filter 27 for which firewall transmission setting has been performed so as to be transmitted to the Web application 24.

That is, the user terminal 3 can connect to the Web application 24 of the gateway apparatus 2. By the way, the connection support apparatus 1 can use a redirect message instead of the response message. The redirect message used in the second embodiment is one obtained by replacing the user terminal individual ID of the redirect message of FIG. 21 with the random number.

When the user performs logout for the Web application 24, the gateway apparatus 2 closes the opened port. In addition, the gateway apparatus 2 releases the firewall transmission setting for the IP filter 25 and the random number filter 27. Then, the gateway apparatus 2 reports termination of the session to the user terminal 3 to the connection support apparatus 1.

EMBODIMENT 3

Figure 24:
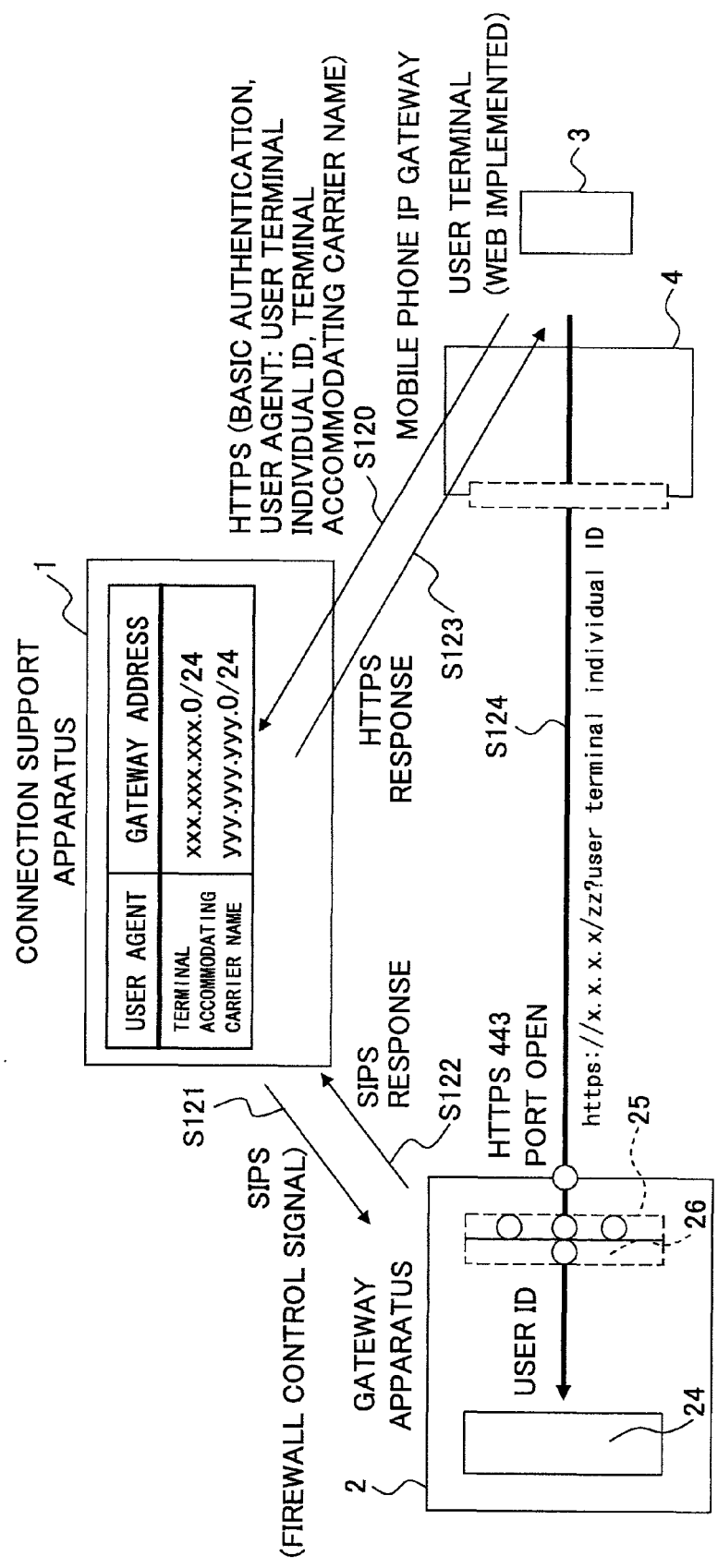
FIG. 24 is a block diagram of a third embodiment of the remote access system according to the present invention.

FIG. 24 is a block diagram of the third embodiment of the remote access system according to the present invention. In the remote access system of the embodiment 3, an example is described in which the user terminal 3 is a mobile phone, for example, that does not have an IP address.

Going to step S120, the user terminal 3 sends, to the connection support apparatus 1, a user ID and a password for basic authentication, and a user terminal individual ID and a terminal accommodating carrier name using the user authentication message shown in FIG. 17 for example.

The connection support apparatus 1 extracts the terminal accommodating carrier name included in a user agent value of the user authentication message. The connection support apparatus 1 has an address list in which the terminal accommodating carrier name and an IP address held by the mobile phone IP gateway apparatus 4 are associated with each other.

After authentication succeeds, the connection support apparatus 1 goes to step S121, and sends a firewall control signal to the gateway apparatus 2 using the firewall control message of FIG. 25. The firewall control message of FIG. 25 includes the address list and the user terminal individual ID.

The gateway apparatus 2 opens a port number reported by the firewall control signal. In addition, the gateway apparatus 2 performs firewall transmission setting for the IP filter 25 such that one or more IP addresses held by the mobile phone IP gateway apparatus 4 included in the address list transmit.

In addition, the gateway apparatus 2 performs firewall transmission setting for the ID filter 26 such that the user terminal individual ID reported by the firewall control signal transmits.

Going to step S122, the gateway apparatus 2 sends a firewall control response message shown in FIG. 19 for example to the connection support apparatus 1. Going to step S123, the connection support apparatus 1 sends, to the user terminal 3, connection information (URL link information) for the user terminal 3 to connect to the gateway apparatus 2 by using a response message shown in FIG. 20, for example.

When the URL link information is selected by the user, the user terminal 3 goes to step S124, and the user terminal 3 sends, to the gateway apparatus 2, a HTTP message including the user terminal individual ID by adding the user terminal individual ID to the URL link information reported from the connection support apparatus 1. By the way, since the user terminal 3 does not have an IP address, the user terminal 3 connects to the gateway apparatus 2 using one of IP addresses held by the mobile phone IP gateway apparatus 4.

The HTTPS message including the user terminal individual ID sent to the gateway apparatus 2 passes through the opened port, the IP filter 25 and the ID filter 26 for which firewall transmission setting has been performed so as to be transmitted to the Web application 24.

That is, the user terminal 3 can connect to the Web application 24 of the gateway apparatus 2 via the mobile phone IP gateway apparatus 4. By the way, the connection support apparatus 1 can use a redirect message shown in FIG. 21 instead of the response message shown in FIG. 20.

When the user performs logout for the Web application 24, the gateway apparatus 2 closes the opened port. In addition, the gateway apparatus 2 releases the firewall transmission setting for the IP filter 25 and the ID filter 26. Then, the gateway apparatus 2 reports termination of the session to the user terminal 3 to the connection support apparatus 1.

By the way, when the gateway apparatus 2 identifies the IP address used by the user terminal 3 for communication, the gateway apparatus 2 releases firewall transmission setting for IP addresses, included in the address list, that are not used for communication by the user terminal 3.

EMBODIMENT 4

Figure 26:
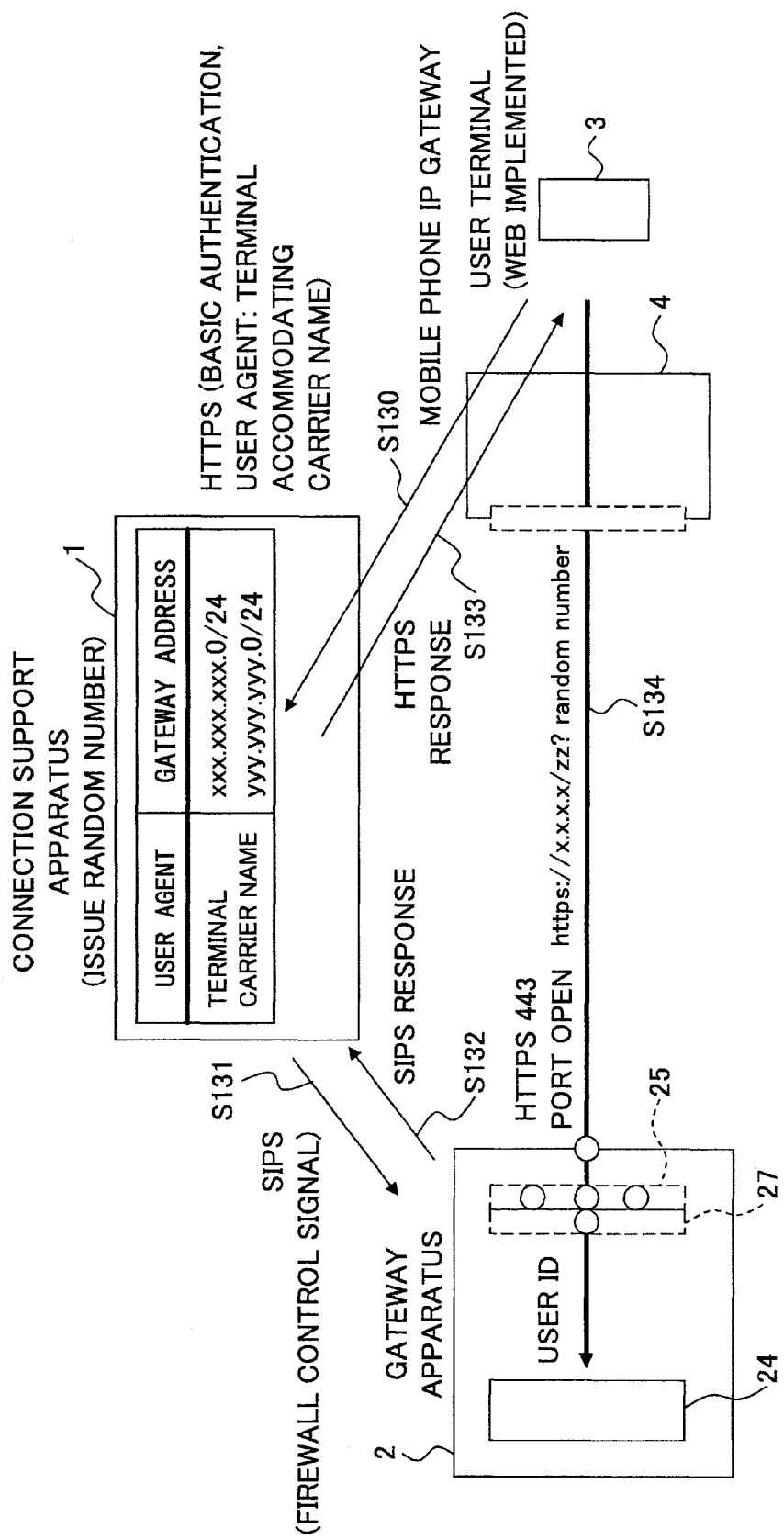
FIG. 26 is a block diagram of a fourth embodiment of the remote access system according to the present invention.

FIG. 26 is a block diagram of the fourth embodiment of the remote access system according to the present invention. In the remote access system of the embodiment 4, an example is described in which the user terminal 3 is a mobile phone, for example, that does not have an IP address.

By the way, since processes of the remote access system of FIG. 24 are the same as those of the remote access system of FIG. 23 except for a part, descriptions are omitted as necessary. Going to step S130, the user terminal 3 sends a user ID and a password for basic authentication, and a terminal accommodating carrier name to the connection support apparatus 1 using the user authentication message shown.

The connection support apparatus 1 extracts the terminal accommodating carrier name included in the user agent value of the user authentication message. The connection support apparatus 1 has an address list in which the terminal accommodating carrier name and IP addresses held by the mobile phone IP gateway apparatus 4 are associated with each other.

After authentication succeeds, the connection support apparatus 1 issues a unique random number. The connection support apparatus 1 goes to step S131, and sends a firewall control signal to the gateway apparatus 2 using the firewall control message. By the way, the firewall control message used in the embodiment 4 is one obtained by replacing the user terminal individual ID of the firewall control message of FIG. 25 with a random number.

The gateway apparatus 2 opens a port number reported by the firewall control signal. In addition, the gateway apparatus 2 performs firewall transmission setting for the IP filter 25 such that one or more IP addresses that are held by the mobile phone IP gateway apparatus 4 and that are included in the address list transmits.

In addition, the gateway apparatus 2 performs firewall transmission setting for the random number filter 27 such that the random number reported by the firewall control signal transmits.

Going to step S132, the gateway apparatus 2 sends a firewall control response message shown in FIG. 19 for example to the connection support apparatus 1. Going to step S133, the connection support apparatus 1 sends, to the user terminal 3, URL link information for the user terminal 3 to connect to the gateway apparatus 2 by using a response message shown in FIG. 20, for example.

By the way, the response message used in the embodiment 4 is one obtained by adding the random number after the URL included in the response message of FIG. 20. Going to step S134, the user terminal 3 sends a HTTPS message including the URL link information reported from the connection support apparatus 1 to the gateway apparatus 2.

Then, the HTTPS message including the URL link information sent to the gateway apparatus 2 passes through the opened port, the IP filter 25 and the random number filter 27 for which firewall transmission setting has been performed so as to be transmitted to the Web application 24.

That is, the user terminal 3 can connect to the Web application 24 of the gateway apparatus 2 via the mobile phone IP gateway apparatus 4. By the way, the connection support apparatus 1 can use a redirect message instead of the response message. The redirect message used in the embodiment 4 is one obtained by replacing the user terminal individual ID of the redirect message of FIG. 21 with the random number.

When the user performs logout for the Web application 24, the gateway apparatus 2 closes the opened port. In addition, the gateway apparatus 2 releases the firewall transmission setting for the IP filter 25 and the random number filter 27. Then, the gateway apparatus 2 reports termination of the session to the user terminal 3 to the connection support apparatus 1.

By the way, when the gateway apparatus 2 identifies the IP address used by the user terminal 3, the gateway apparatus 2 releases firewall transmission setting for IP addresses, included in the address list, that are not used for communication by the user terminal 3.

EMBODIMENT 5

Figure 27:
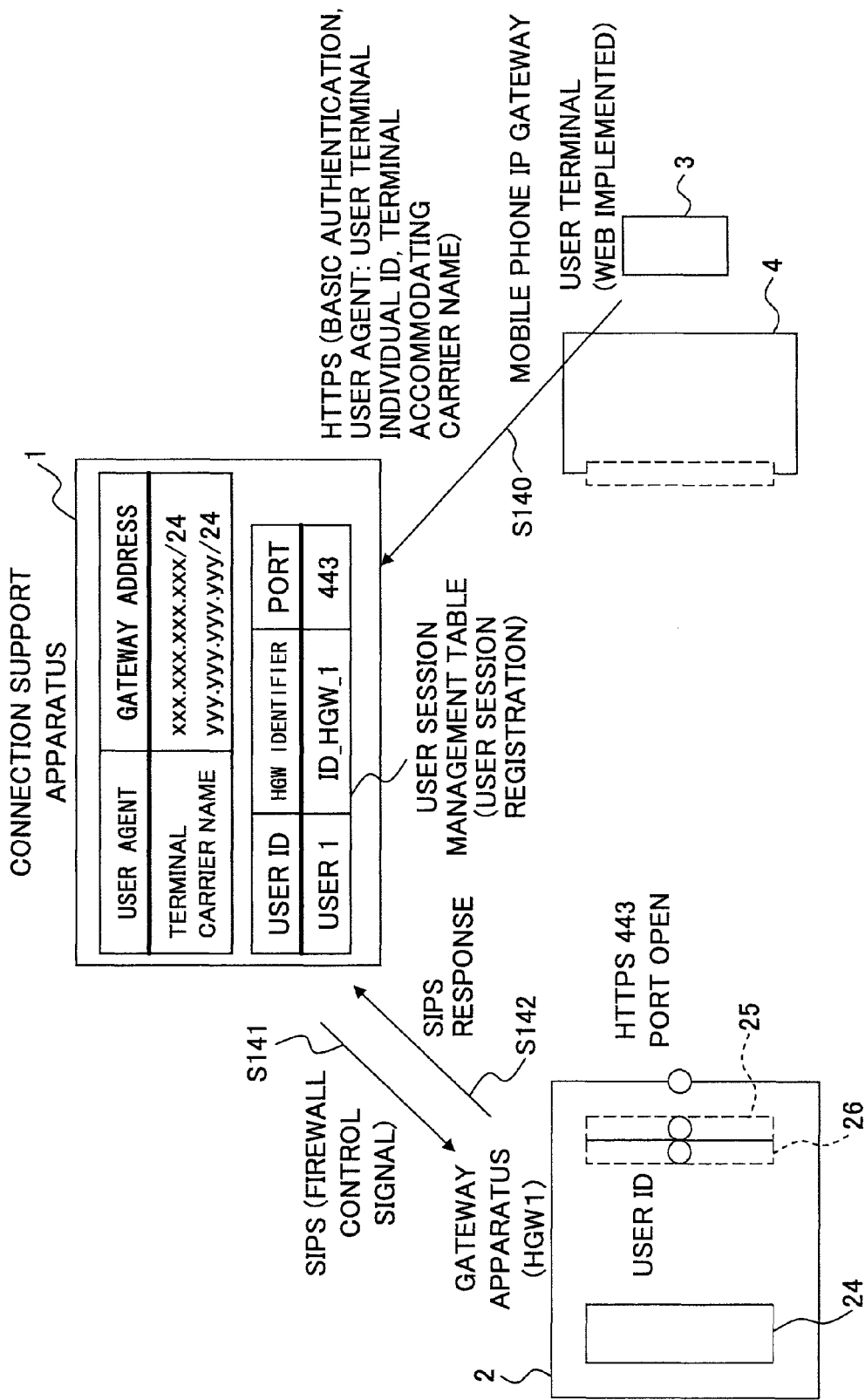
FIG. 27 is a sequence diagram of an example showing processes of the connection support apparatus in a case when session starts.

In this embodiment, processes for managing a session between the gateway apparatus 2 and the user terminal 3 are described taking the remote access system of the above-mentioned third embodiment as an example. FIG. 27 is a sequence diagram of an example showing processes of the connection support apparatus when a session starts.

By the way, since the processes of the remote access system of FIG. 27 are the same as the processes of FIG. 24 except for a part, descriptions are omitted as necessary.

Processes of steps S140-S142 are the same as the processes of steps S120-S122 of FIG. 24. In step S142, after receiving the firewall control response message shown in FIG. 19 from the gateway apparatus 2, the connection support apparatus registers, in the user session management database as a new session, a user ID of the user who is a subject of firewall control, a HGW identifier of the gateway apparatus 2, and a port number indicating a port to which the user terminal 3 connects.

In the present embodiment, a session is regarded to be started when receiving the firewall control response message. But, a session may be regarded to be started when the gateway apparatus 2 reports connection of the user terminal 3 to the connection support apparatus 1 when the user terminal 3 connects to the gateway apparatus 2. Processes after that are the same as those of FIG. 24.

Figure 28:
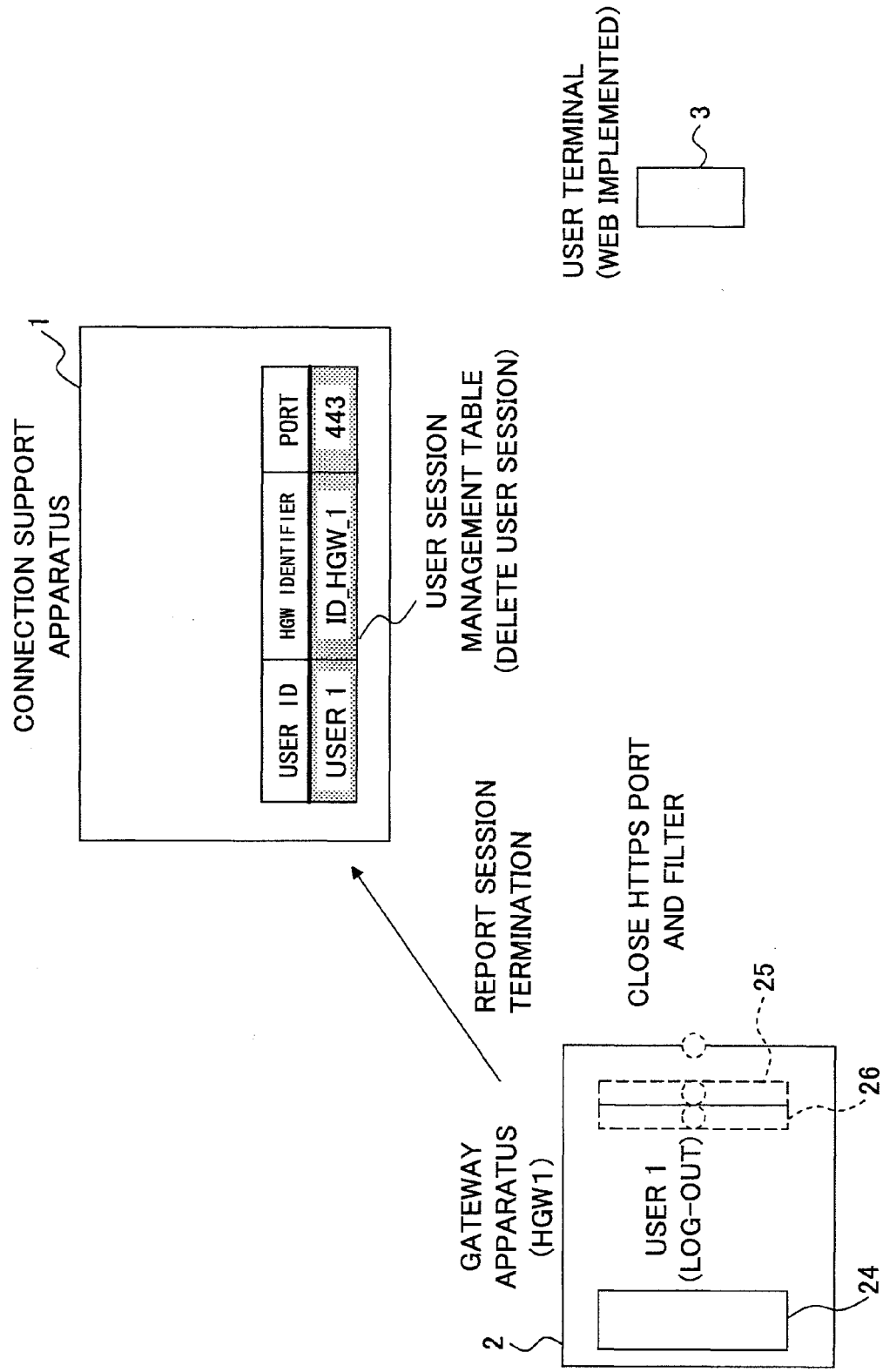
FIG. 28 is a sequence diagram of an example showing processes of the connection support apparatus in a case when session terminates.

FIG. 28 is a sequence diagram of an example showing processes of the connection support apparatus when the session terminates. When receiving a logout request, for example, from the user terminal 3, the gateway apparatus 2 sends a session termination report message shown in FIG. 29 to the connection support apparatus 1.

The connection support apparatus 1 deletes the session between the gateway apparatus 2 and the user terminal 3 from the user session management database based on the user ID, the HGW identifier and the port number that are included in the received session termination report message.

After deleting the session between the gateway apparatus 2 and the user terminal 3 from the user session management database, the connection support apparatus 1 sends a session termination response message shown in FIG. 30 to the gateway apparatus 2.

By the way, when the session is managed as described in the embodiment 5, it is necessary to avoid a case in which the gateway apparatus 2 is forcedly terminated so that the connection support apparatus 1 erroneously continues to manage the session.

Thus, the connection support apparatus 1 may periodically send, to the gateway apparatus 2, a firewall updating message including the user ID, the user terminal individual ID, and a firewall control port number and the like so as to check a status of the session.

When receiving a firewall updating response message from the gateway apparatus 2, the connection support apparatus 1 assumes that the session is being kept. On the other hand, the firewall updating response message is not received, the connection support apparatus 1 assumes that the session is terminated, and deletes the session between the gateway apparatus 2 and the user terminal 3 from the user session management database. Accordingly, the connection support apparatus 1 can manage the session with reliability.

By the way, the firewall updating message and the firewall updating response message can be realized by using messages similar to the firewall control message and the firewall control response message respectively. The gateway apparatus 2 regards first reception of the message as firewall control, and regards further reception of the message as firewall update.

According to such management of the session by the connection support apparatus 1, billing according to remote accessing time for each user can be also realized in the remote access system of the present embodiment.

EMBODIMENT 6

Figure 31:
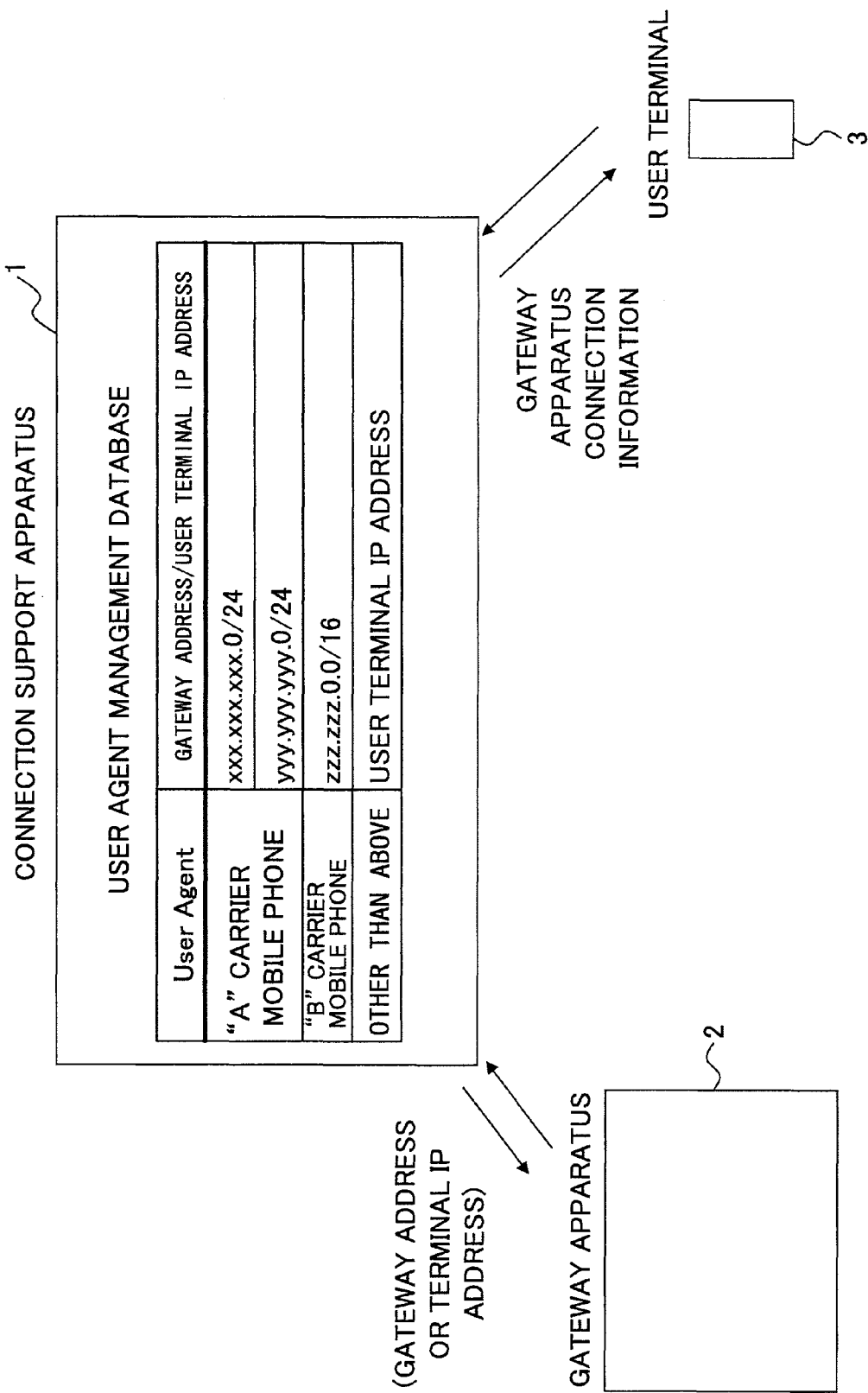
FIG. 31 is a block diagram of a fifth embodiment showing a remote access system according to the present invention.

FIG. 31 is a block diagram of the fifth embodiment showing a remote access system according to the present invention. In the remote access system of the embodiment 5, an example is described in which firewall control is performed according to terminal type or terminal accommodation carrier type.

The connection support apparatus 1 includes a user agent management database. The connection support apparatus 1 receives a message including user authentication information, and searches for a user agent value included in the received message when the user selects a gateway apparatus of a connection destination.

In the present embodiment, when the user agent value indicates a mobile phone of A carrier or B carrier, the connection support apparatus 1 sends a firewall control message including the IP address held by the mobile phone IP gateway apparatus to the gateway apparatus 2. On the other hand, when the user agent value does not indicate a mobile phone of A carrier or B carrier, the connection support apparatus 1 determines that the user terminal 3 has an IP address, and sends a firewall control message including the IP address of the user terminal 3 to the gateway apparatus 2.

Therefore, in the remote access system of the embodiment 5, firewall control according to terminal type or terminal accommodating carrier type can be realized with a single connection support apparatus 1.

(Whole Sequence of the Remote Access System of the Present Invention)

Figure 32:
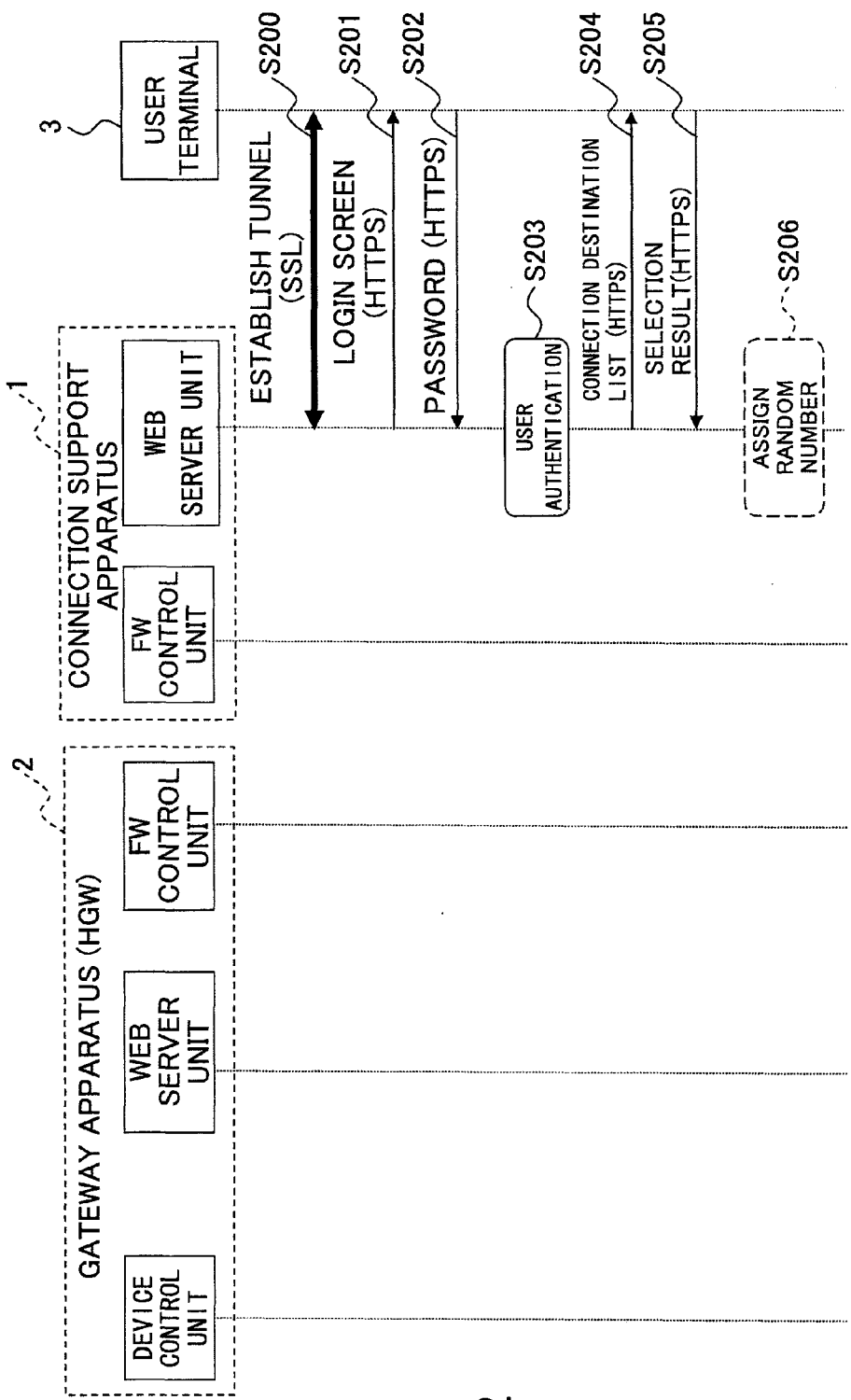
FIG. 32 shows a whole sequence of the remote access system using a random number.
Figure 33:
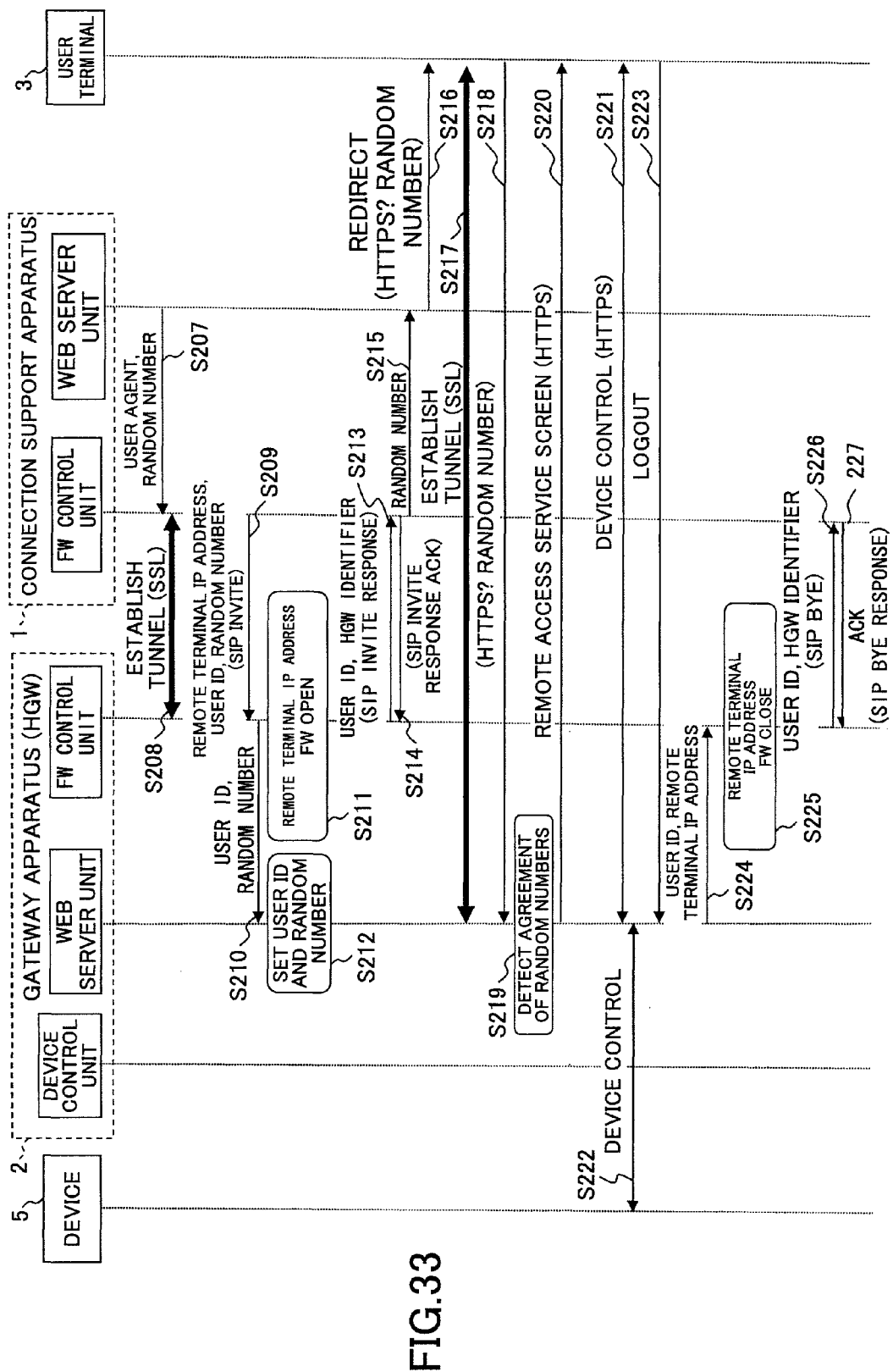
FIG. 33 shows a whole sequence of the remote access system using a random number.
Figure 34:
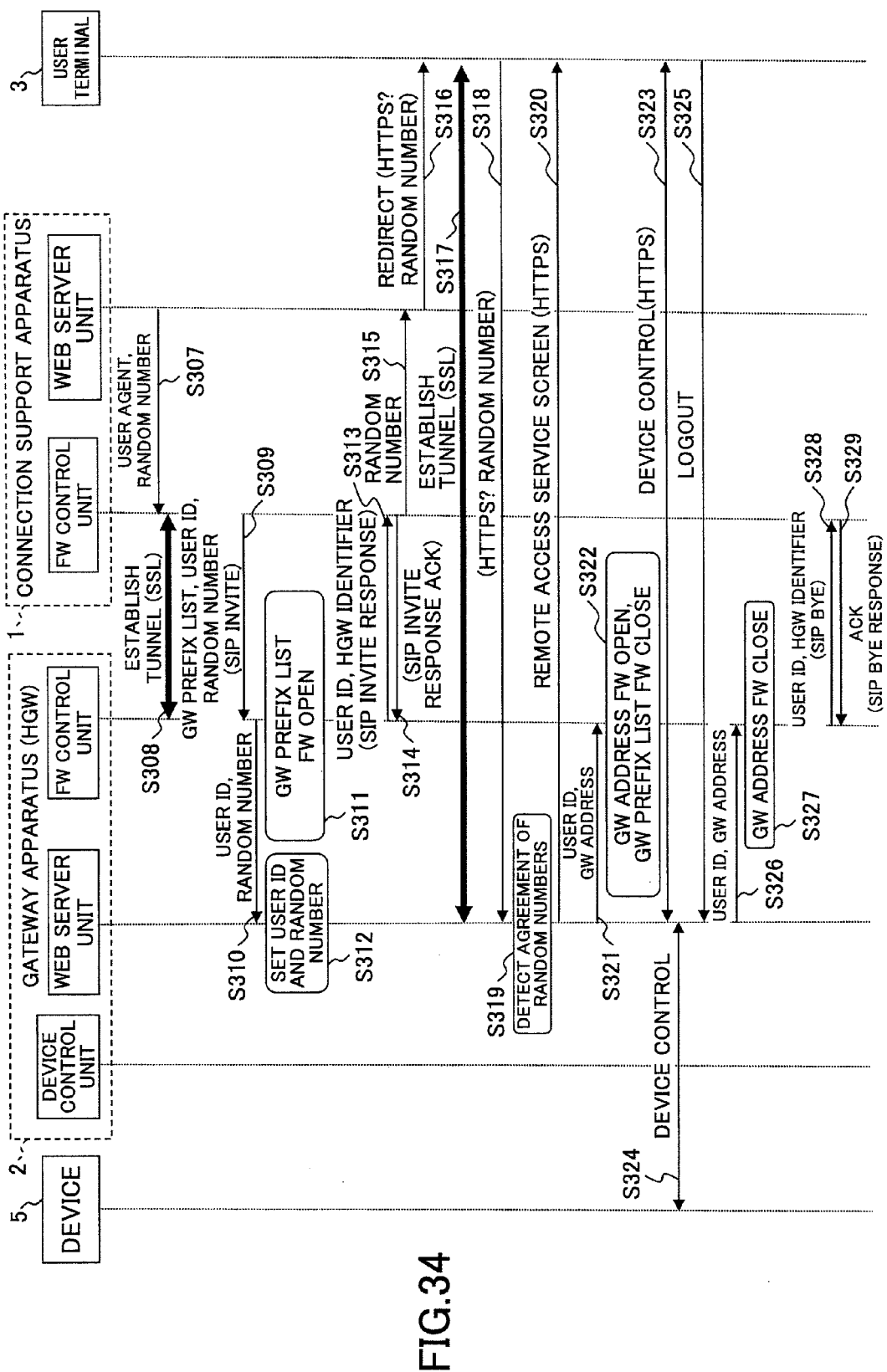
FIG. 34 shows a whole sequence of the remote access system using a random number.

FIGS. 32-34 show a whole sequence of the remote access system using the random number. By the way, in FIGS. 32-34, the Web server unit of the connection support apparatus 1 corresponds to the user request receiving function 11, the user authentication function 12 and the user connection destination management function 13 shown in FIG. 4, and the FW control unit corresponds to the firewall control function 14 and the user-gateway apparatus session management function 15. In addition, in FIGS. 32-34, the FW setting unit of the gateway apparatus 2 corresponds to the firewall setting function 21, and the Web server unit corresponds to the user request receiving function 22. In addition, in FIGS. 32-34, the device 5 corresponds to an apparatus for performing the above-mentioned remote accessing.

FIG. 32 is a sequence diagram showing processes up to random number assignment in the connection support apparatus. In steps S200-S203, authentication of the user terminal 3 is performed. In steps S204-S205, a connection destination list is sent to the user terminal 3, and a connection destination selected by the user is reported to the connection support apparatus 1. In step S206, a unique random number (session ID for example) is assigned.

FIG. 33 is a sequence diagram showing processes after the random number is assigned in the case where the user terminal has an IP address. In steps S207-S209, a firewall control message is sent from the connection support apparatus 1 to the gateway apparatus 2.

In steps S210-S212, firewall transmission setting is performed so as to permit connection from the user terminal 3. In step S213, a firewall control response message is sent from the gateway apparatus 2 to the connection support apparatus 1. In step S214, ACK for reception of the SIPS response message is sent from the connection support apparatus 1 to the gateway apparatus 2.

In steps S215-S216, URL link information is sent from the connection support apparatus 1 to the user terminal 3. By the way, a random number is added in the URL link information. In steps S217-S219, a HTTPS message including the URL link information is sent from the user terminal 3 to the gateway apparatus 2.

The HTTPS message that is sent to the gateway apparatus 2 and that includes the URL link information passes through the opened port and the IP filter and the random number filter on which firewall transmission setting has been performed so as to arrive at the Web server unit.

In steps S220-S222, remote access to the device 5 is performed. In steps S223-S227, since logout is performed, the gateway apparatus 2 closes the opened port and releases the firewall transmission setting for the IP filter and the random number filter.

Then, the gateway apparatus 2 reports termination of the session between the gateway apparatus 2 and the user terminal 3 to the connection support apparatus 1. In addition, ACK for the session termination is sent from the connection support apparatus 1 to the gateway apparatus 2.

FIG. 34 is a sequence diagram showing processes after a random number is assigned in the case where the user terminal is a mobile phone. In steps S307-S309, a firewall control message is sent from the connection support apparatus 1 to the gateway apparatus 2. By the way, the GW prefix list corresponds to the above-mentioned address list.

In steps S310-S312, firewall transmission setting is performed so as to permit connection from the user terminal 3. In step S313, a firewall control response message is sent from the gateway apparatus 2 to the connection support apparatus 1. In step S314, ACK for reception of the SIPS response message is sent from the connection support apparatus 1 to the gateway apparatus 2.

In steps S315-S316, URL link information is sent from the connection support apparatus 1 to the user terminal 3. By the way, a random number is added in the URL link information. In steps S317-S319, a HTTPS message including the URL link information is sent from the user terminal 3 to the gateway apparatus 2.

The HTTPS message that is sent to the gateway apparatus 2 and that includes the URL link information passes through the opened port and the IP filter and the random number filter on which firewall transmission setting has been performed so as to arrive at the Web server unit.

In steps S320-S322, remote access to the device 5 is performed. By the way, in steps S321 and S322, the IP address used by the user terminal 3 for communication is ascertained so that firewall transmission setting is released for IP addresses that are not used for communication and that are included in the GW prefix list.

In steps S325-S329, since logout is performed, the gateway apparatus 2 closes the opened port and releases the firewall transmission setting for the IP filter and the random number filter.

Then, the gateway apparatus 2 reports termination of the session between the gateway apparatus 2 and the user terminal 3 to the connection support apparatus 1. In addition, ACK for the session termination is sent from the connection support apparatus 1 to the gateway apparatus 2.

(Effects of the Remote Access System of the Present Invention)

In the remote access system of the present invention, since it is not necessary that the gateway apparatus 2 always opens a port to which the user terminal 3 connects, risk of exposure to DoS attack and possibility to be remotely accessed by an illegal user can be largely decreased.

In addition, since the connection support apparatus 1 manages connection information for the user terminal 3 to connect to the gateway apparatus 2, information management in the user terminal 3 is not complicated even when the number of gateway apparatuses increases. In addition, even when the user terminal 3 does not have an IP address, remote access from the user terminal to the gateway apparatus is available easily and securely by using the above-mentioned address list.

Accordingly, according to the remote access system of the present invention, the user can perform remote access easily and securely using various user terminals.

The present invention is not limited to the specifically disclosed embodiments, and variations and modifications may be made without departing from the scope of the invention.

The invention claimed is:

1. A connection support apparatus comprising:
a control unit configured to perform an authentication of a user terminal based on user authentication information received from the user terminal, and to send a control request added with a random number to a gateway apparatus to open a closed port of the gateway apparatus in order to permit a connection from the user terminal for which the authentication succeeds; and
a communication unit configured to provide the user terminal with connection information, added with the random number, and used for connecting the user terminal to the gateway apparatus when the control unit receives a response to the control request from the gateway apparatus, wherein
the control unit adds the random number, an address list of address identifiers held by one or more other gateway apparatuses through which the user terminal communicates, and an application identifier to the control request when an address identifier of the user terminal is not unique.

2. The connection support apparatus as claimed in claim 1, wherein the control unit adds the random number, an address identifier of the user terminal, and an application identifier to the control request when the address identifier of the user terminal is unique.

3. The connection support apparatus as claimed in claim 1, wherein the control unit performs a control on the gateway apparatus to which the user terminal connects according to a terminal type of the user terminal.

4. The connection support apparatus as claimed in claim 1, wherein the control unit performs a control on the gateway apparatus to which the user terminal connects according to a terminal accommodating carrier type of the user terminal.

5. The connection support apparatus as claimed in claim 1, wherein the communication unit provides the user terminal with a mechanism for connecting to the gateway apparatus when the user terminal includes a browser, in order to permit the connection of the user terminal to the gateway apparatus.

6. The connection support apparatus as claimed in claim 1, wherein messages are exchanged between the user terminal and the gateway apparatus via an encrypted communication route.

7. The connection support apparatus as claimed in claim 1, further comprising:
a session management unit configured to manage a session between the user terminal and the gateway apparatus by using a user identifier of a user who operates the user terminal and an identifier of the gateway apparatus or, by using the user identifier of the user, the identifier of the gateway apparatus, and an application identifier.

8. The connection support apparatus as claimed in claim 7, wherein the session management unit registers the session between the user terminal and the gateway apparatus when the control unit receives the response from the gateway apparatus after sending the control request to the gateway apparatus or when the user terminal connects to the gateway apparatus.

9. The connection support apparatus as claimed in claim 7, wherein the session management unit deletes a session between the user terminal and the gateway apparatus when a communication between the user terminal and the gateway apparatus ends or when a communication between the user terminal and an application of the gateway apparatus ends.

10. The connection support apparatus as claimed in claim 7, wherein the session management unit, after registering the session between the user terminal and the gateway apparatus, periodically sends a session check message added with the user identifier, the identifier of the gateway apparatus, and the application identifier to the gateway apparatus in order to check a status of the session to the user terminal.

11. The connection support apparatus as claimed in claim 1, further comprising:
a connection destination management unit configured to receive an identifier of the gateway apparatus and the connection information from the gateway apparatus when the connection information used for connecting the user terminal to the gateway apparatus is changed, and to manage the connection information.

12. A gateway apparatus comprising:
a setting unit configured to receive a control request added with a random number from a connection support apparatus, and to make settings for providing a user terminal for which an authentication in the connection support apparatus succeeds with a connection permission; and
a communication unit configured to send a response to the control request to the connection support apparatus, and to open a closed port of the gateway apparatus in order to permit a connection from the user terminal provided with the connection permission to the gateway apparatus based on a comparison of the random number included in the control request received from the connection support apparatus and the random number received from the user terminal, wherein
the setting unit makes settings for providing the user terminal with the connection permission according to the random number, an address list of address identifiers held by one or more other gateway apparatuses through which the user terminal communicates, and an application identifier that are included in the control request from the connection support apparatus when an address identifier of the user terminal is not unique.

13. The gateway apparatus as claimed in claim 12, wherein the setting unit makes settings for providing the user terminal with the connection permission according to the random number, an address identifier of the user terminal, and an application identifier that are included in the control request from the connection support apparatus when the address identifier of the user terminal is unique.

14. The gateway apparatus as claimed in claim 12, wherein the setting unit does not permit a connection to an address other than a particular address when the user terminal makes the connection to the gateway apparatus using the particular address identified by a particular address identifier in the address list.

15. A connection method to connect a user terminal and a gateway apparatus using a connection support apparatus, comprising:
performing, by the connection support apparatus, an authentication of a user terminal based on user authentication information received from the user terminal;
sending, by the connection support apparatus to the gateway apparatus, a control request added with a random number to open a closed port of the gateway apparatus in order to permit a connection from the user terminal for which the authentication succeeds; and
providing, by the connection support apparatus to the user terminal, connection information added with the random number and used for connecting the user terminal to the gateway apparatus when a response is received from the gateway apparatus in response to the control request sent to the gateway apparatus by the sending, wherein
the control request further includes, when an address identifier of the user terminal is not unique, an address list of address identifiers held by one or more other gateway apparatuses through which the user terminal communicates and an application identifier.

* * * * *